United States Patent [19]
Bähr

[11] Patent Number: 5,863,429
[45] Date of Patent: Jan. 26, 1999

[54] METHOD AND APPARATUS FOR REMOVING WATER FROM SLUDGE AND SIMILAR SUBSTANCES

[76] Inventor: Albert Bähr, 10, Am Hungerberg, D-66564 Ottweiler, Germany

[21] Appl. No.: 563,426

[22] Filed: Nov. 28, 1995

[30] Foreign Application Priority Data

Dec. 1, 1994 [DE] Germany .......................... 44 42 623.2
Oct. 24, 1995 [DE] Germany ........................ 195 39 484.4

[51] Int. Cl.⁶ .............................. B01D 33/29; B30B 9/24
[52] U.S. Cl. .......................... 210/385; 210/400; 210/401; 100/111; 100/116; 100/118; 100/152; 100/215
[58] Field of Search .................................. 210/230, 400, 210/770, 385, 401; 100/118, 152, 110, 116, 215, 111

[56] References Cited

U.S. PATENT DOCUMENTS

| | | |
|---|---|---|
| 3,796,316 | 3/1974 | Matz . |
| 4,387,633 | 6/1983 | Ballantyne . |
| 4,396,130 | 8/1983 | Robinson . |
| 4,660,608 | 4/1987 | Arai . |
| 4,906,369 | 3/1990 | Bähr . |
| 5,051,194 | 9/1991 | Bahr . |
| 5,236,583 | 8/1993 | Wang . |

FOREIGN PATENT DOCUMENTS

| | | |
|---|---|---|
| 0264899 | 4/1988 | European Pat. Off. . |
| 0396079 | 11/1990 | European Pat. Off. . |
| 0397082 | 11/1990 | European Pat. Off. . |
| 0407884 | 1/1991 | European Pat. Off. . |
| 4223022 | 1/1994 | Germany . |

*Primary Examiner*—Robert J. Popovics
*Attorney, Agent, or Firm*—Evenson, McKeown, Edwards & Lenahan, PLLC

[57] ABSTRACT

In a method and apparatus for removing water from sludge the sludge is introduced into an intermediate chamber from which it is fed into at least one sludge chamber having a filter surface. A hydrostatic pressure is built up in the sludge chamber to remove the water. The sludge chamber is then opened and the filter surface moved out of the sludge chamber to remove the filter cake. The hydrostatic pressure is generated by the sludge being transferred out of the intermediate container, after the continuous feed of sludge thereto has been cut off, by positive displacement of the volume of sludge from the intermediate container into the sludge chamber. The feed of sludge into the sludge chamber may occur simultaneously at a plurality of points from a corresponding number of intermediate containers.

34 Claims, 22 Drawing Sheets

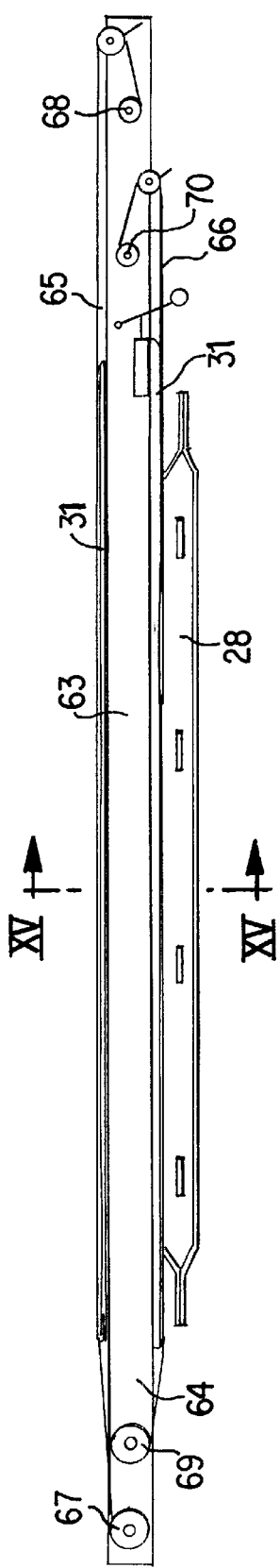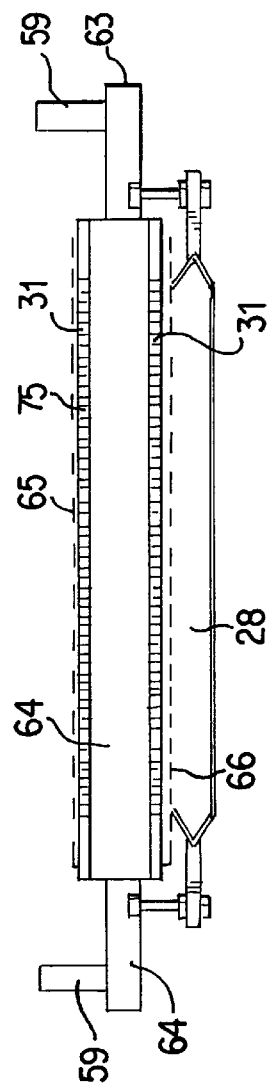
FIG. 14
FIG. 15

METHOD AND APPARATUS FOR REMOVING WATER FROM SLUDGE AND SIMILAR SUBSTANCES

FIELD OF THE INVENTION

The invention concerns a method of removing water from sludge and similar substances, and an apparatus for carrying such a method into effect.

Hereinafter in this specification the term sludge will be used generally to denote sludge in the narrow sense, for example the sludge which occurs in a sewage treatment installation, as well as other substances which exhibit a sludge-like behaviour or characteristics.

BACKGROUND OF THE INVENTION

One form of generally employed operating procedure for removing water from sludge such as that which is produced in a sewage treatment installation involves adding an organic or inorganic flocculating agent or a filtering aid and then removing the water in chamber-type filter presses. In chamber-type filter presses of the usual design configuration the sludge is fed into filter chambers which are closed on all sides and the medium from which water is to be removed continues to be pumped, by means of pumps, under high pressure, until the desired content of dry substance is attained. In that procedure, the filtrate contained in the medium from which water is to be removed is discharged through the separation walls of the individual filter chambers, such walls consisting of filter material. A disadvantage of known chamber filter presses of that kind and the corresponding operating procedure involved in the removal of water is that, while involving a very high level of technical expenditure, the efficiency with which the pressure is transmitted to the sludge from which water is to be removed decreases from one chamber to another in the direction of conveying movement. Furthermore the hydrostatic pressure for removing water is built up by pumps, and that gives rise to the serious disadvantage that flocculation of the sludge, which is achieved by use of a flocculating agent or other filtering aid, is destroyed again in the pumping phase. Another disadvantage lies in the discontinuous mode of operation of such chamber filter presses as the feed of sludge has to be interrupted when the sludge chamber is opened. Furthermore the entire water-removal procedure including the preliminary step in removing water is effected at low pressure in the chamber which is designed for high pressures so that the chamber is used in a highly uneconomical fashion.

SUMMARY OF THE INVENTION

An object of the present invention is to provide a completely new method of removing water from sludge in which flocculation of the sludge is not affected adversely during the operation of building up a hydrostatic pressure and which, while involving a low level of technical expenditure, ensures a considerably improved level of efficiency and also a substantially improved rate of through-put.

Another object of the present invention is to provideapparatus for removing water from sludge which is of a simple design configuration but which affords an effective water-removal procedure while not adversely affecting flocculation of the sludge being processed thereby.

In accordance with the principles of the present invention, in regard to the method, the foregoing and other objects are achieved by a method of removing water from sludge in which the sludge is fed into at least one sludge chamber having a filter surface and a hydrostatic pressure is built up in the sludge chamber to remove water from the sludge. After the water-removal operation, for conveying away the resulting filter cake, the sludge chamber is opened and the filter surface with the filter cake is moved out of the sludge chamber. The sludge is initially introduced into at least one intermediate container which communicates with the sludge chamber, and thereafter the feed of sludge to the intermediate container is cut off. The above-mentioned hydrostatic pressure is then produced by positive displacement of the volume of sludge from the intermediate container into the sludge chamber.

It will be appreciated that in that case, using very simple means, more specifically the intermediate container which permits a positive displacement of volume by for example the intermediate container being in the form of a piston-cylinder assembly, the hydrostatic water-removal pressure can be built up in an extremely gentle fashion without the flocculated sludge being mechanically affected in such a way that flocculation thereof could be impaired.

In accordance with a preferred feature the intermediate container accommodates an amount of sludge which approximately corresponds to twice the volume of the sludge chamber.

In accordance with another preferred feature of the invention, after the sludge chamber is filled, the hydrostatic pressure is produced by positive displacement of the part of the second filling of the intermediate container, which part exceeds the volume of the sludge chamber.

A further preferred feature of the invention provides that, depending on the specific characteristics in terms of removal of water of the sludge, a hydrostatic pressure of between about 5 and 10 bars is produced, as that can be effected using very simple means and at low structural cost.

In a particularly preferred feature of the invention the feed of sludge to the intermediate container is by way of a compensating container which is continuously filled with sludge. That achieves the advantage of a virtually continuous mode of operation in that at least the feed of sludge can be effected continuously.

A preferred feature of the invention provides that a preliminary operation for the removal of water from the sludge is simultaneously effected in the compensating container. This represents something completely novel in the field of chamber filter presses and the operating procedure related thereto, and affords the advantage that the level of water-removal efficiency is considerably increased thereby, insofar as the desired contents of dry substance can be achieved in shorter working cycles as the sludge chamber is charged with sludge which already has a higher content of dry substance. In contrast to the prior procedures in which the various water-removal steps are carried out successively within the same chamber, in accordance with this feature of the invention the water-removal stages are operated in mutually parallel relationship, thereby achieving on the one hand a considerable reduction in the length of the cycle time in the sludge chamber and on the other hand greatly increasing the through-put rate.

In another preferred feature of the invention, after a determinable hydrostatic pressure is reached in the sludge chamber, the latter is separated from the intermediate container and then the volume of the sludge chamber is reduced in size, in which case a mechanical water-removal pressure is produced which is higher than the hydrostatic pressure previously attained. That provides that, as from the pressure level from which further removal of water by means of the hydrostatic pressure would be possible only at a correspondingly high level of energy costs and a correspondingly high level of expenditure of structural nature as well as involving a considerable amount of time, the sludge which is then separated from the pressure container is mechanically compressed so that further water is removed from the sludge by the mechanically produced pressure.

A further preferred feature provides that the sludge is introduced into the sludge chamber at a plurality of points simultaneously from a number of intermediate containers, corresponding to the number of said points. That provides that the desired hydrostatic pressure is reached comparatively quickly, in that this operating procedure avoids the filtration pressure having to be transmitted through the entire substance in the chamber.

In accordance with the apparatus aspect of the present invention, the foregoing and other objects are attained by an apparatus for the removal of water from sludge, having at least one laterally closed sludge chamber which has filter surfaces and a sludge inlet connected to a device for producing a hydrostatic filtration pressure. The filtration surfaces are arranged between pressure plates which are movable relative to each other and the filter surfaces are adapted to be displaceable relative to the sludge chamber for discharge of the filter cake after opening of the pressure plates. The means for producing the hydrostatic filtration pressure is in the form of one or more intermediate containers, and the at least one intermediate container is in the form of a piston-cylinder unit having a cylinder housing and a piston displaceable therein, and a drive means for displacement of the piston. The piston-cylinder unit has a sludge inlet and a sludge outlet which communicates with the sludge chamber. Alternately actuable shut-off and control valves are disposed at the sludge inlet and the sludge outlet.

A preferred aspect of the apparatus provides that the sludge chamber has a plurality of sludge inlets and that there is a corresponding number of intermediate containers, in which each sludge inlet is connected by a separate connecting line to one of the sludge inlets of the sludge chamber. In that way the sludge is actually uniformly introduced into the sludge chamber at a plurality of points and the hydrostatic water-removal pressure is also built up uniformly and simultaneously in the sludge chamber from a plurality of points.

A further preferred feature of the invention provides that the valves are in the form of globe valves. That provides that the flocculated sludge is subjected to further conveying movement in a particularly gentle and careful fashion in that valves of that kind afford the full line or conduit cross-section and therefore do not offer the flow any bend or disturbance locations at which the flocculated sludge could be damaged and the flocculated nature thereof adversely affected.

In a particularly preferred configuration according to the invention the filter surfaces are formed by filter belts which can be displaced with a rectilinear reciprocating movement. In that way it is possible to avoid the operation, which is an expensive one, of discharging the sludge cake which is required in a known chamber-type filter press, insofar as, after the water-removal operation has been effected, the filter belts can take the pressed filter cake obtained laterally out of the sludge chamber when it has been opened, and thereafter the filter belts or cloths can be cleaned in a very simple manner in the course of the return movement thereof, during which they can be moved back again into the sludge chamber.

Another preferred feature of the invention provides that the sludge chamber is formed by an upper and a lower filter surface, between which is arranged a flexible seal which surrounds the sludge chamber. That provides a particularly simple and effective construction for a sludge chamber which can be operated opened and closed in a cyclic fashion.

In that arrangement the seal is preferably fixed to an auxiliary frame structure, while in a particularly preferred configuration the auxiliary frame structure is movably suspended on the upper pressure plate.

In an advantageous development according to the invention the sludge chamber is of an oval contour as that provides for particularly advantageous distribution of the pressure in respect of the seal surrounding the sludge chamber.

A further preferred feature of the invention is that each filter surface is supported outside the sludge chamber on a mounting or support plate provided with passages or ducts which are open to the filter surface. That provides for rapid and reliable discharge of the filtrate which is produced in the water-removal operation, on the outside of the filter surfaces, both on the top side of the sludge chamber and also on the bottom side thereof.

In this embodiment it is preferable for the sludge chamber, with the filter surfaces, to be arranged inclinedly relative to the horizontal in the longitudinal direction as in that way the filtrate which is received by the passages or ducts in the mounting or support plate is quickly conveyed away because of the resulting fall.

In that arrangement a preferred inclination is one which gives a fall for the filter surfaces of about 10%.

It is further preferred in this respect for the passages or ducts to be parallel to the main axis of the sludge chamber so that, because of the fall, the filtrate issues in opposite relationship to the discharge direction at the end of the sludge chamber.

In a particularly preferred embodiment according to the invention the lower pressure plate is supported on high pressure-producing means, by means of which the volume of the sludge chamber can be reduced after the hydrostatic water-removal pressure has been reached, in order thereby to generate an additional mechanical pressure for removing water from the sludge.

In a particularly preferred configuration in that respect the lower pressure plate is in the form of a hydraulic bed insofar as a number of high pressure-producing devices are arranged in side-by-side relationship distributed over the length and/or width of the lower pressure plate.

In that respect it is advantageous for the high pressure-producing devices to be disposed in a plurality of parallel rows within the oval contour of the sludge chamber, with the high pressure-producing devices of adjacent rows being displaced relative to each other.

In accordance with another preferred feature of the invention the high pressure-producing devices may each be arranged laterally outside the region of the sludge chamber. Preferably the high pressure-producing devices may be in the form of hydraulic single-acting cylinders. That configuration affords the advantage that the enormous pressures required can be achieved with comparatively inexpensive high pressure-producing devices and at the same time flexural stresses are avoided as the high pressure is produced where it is required, more specifically in the region of the surface extent of the sludge chamber itself.

In accordance with another preferred feature of the invention the closed position of the sludge chamber is locked by mechanical means, a further preferred configuration in this respect providing that the locking action is afforded by a locking latch or pawl assembly acting on the upper pressure plate. That affords the advantage that, during the water-removal operation, the sludge chamber is held closed in a reliable fashion and using very simple means, and the reaction forces which occur are reliably absorbed.

In a particularly preferred feature of the invention a plurality of sludge chambers are disposed in superposed relationship.

For respectively providing a further sludge chamber, disposed between the upper and the lower pressure plates is a respective intermediate plate which, on its top side and its underside, has a respective mounting or support plate, and a respective filter belt. An auxiliary frame structure with seal is further suspended on the underside of the or each intermediate plate. By adopting this kind of construction, virtually any number of sludge chambers can be produced in the form of a modular structure, in accordance with the respective requirements in terms of through-put.

Another preferred feature of the invention may provide that a preliminary water-removal device is disposed upstream of the or each intermediate container, the sludge outlet of the preliminary water-removal device being connected to the sludge feed line of the pressure container.

The preliminary water-removal device is advantageously in the form of a compensating or equalising container having an inlet connected to a continuous sludge feed.

In a preferred embodiment of the invention the preliminary water-removal device has one or more filter cages or baskets which are immersed in the sludge in the compensating container and which are provided with a filtrate outlet.

A particularly preferred feature of the invention provides that the filter basket is arranged stationarily and one or more brushes which extend over the height of the filter basket rotate therearound on the filtrate side thereof. The slowly rotating brushes afford a considerable improvement in the level of performance in terms of removing water from the sludge without the flocculation of the sludge being adversely affected as the brushes are arranged on the filtrate side.

In a further preferred feature of the invention disposed between the pressure plates and/or the intermediate plates are stops or abutments for fixing the height of the sludge chamber. This feature is advantageous in particular in conjunction with the above-indicated feature of mechanically locking the sludge chamber in the closed position, as in that way the closed position is clearly defined.

In a configuration of the apparatus according to the invention in which the volume of the sludge chamber is additionally reduced by mechanical means after the hydrostatic water-removal pressure has been reached, it is advantageous for the stops or abutments to be adapted to be resilient or compressible, in accordance with the reduction in volume of the sludge chamber or the resulting reduction in height of the sludge chamber.

In another aspect the invention concerns a seal for laterally sealing a pressure chamber which can be reduced in volume in a vertical direction, as set forth herein.

Further objects, features and advantages of the invention will be apparent from the following description of preferred embodiments thereof.

BRIEF DESCRIPTION OF THE-DRAWINGS

FIG. 1 is a diagrammatic view of individual parts of an apparatus according to the invention to describe the method according to the invention in a first embodiment, in the manner of a chamber filter press, FIG. 2 is a view corresponding to FIG. 1 showing the method according to the invention, and also showing the possibility of producing a mechanical water-removal pressure, FIG. 3 is a view corresponding to FIG. 2 but with two sludge chambers operating in superposed relationship, FIG. 4 is a view corresponding to FIG. 2 but in which the sludge chamber is arranged inclinedly in order to drain off the filtrate on the top side of the sludge chamber, FIG. 5 is a diagrammatic sectional view of a first embodiment of the apparatus according to the invention, showing a preliminary water-removal stage, an intermediate container and the sludge chamber, FIG. 6 is a view corresponding to FIG. 5 of a second embodiment, FIG. 7 is a view in section taken along line VII—VII in FIG. 6, FIG. 8 is a highly simplified view in section of a preliminary water-removal stage as can be used in the embodiments of FIGS. 1 through 4, FIG. 9 is a diagrammatic view in section of a preferred embodiment of one of the intermediate containers, FIG. 10 is a sectional view of the structure in principle of the sludge chamber as shown in FIG. 1, FIG. 11 is a view in section taken along line XI—XI in FIG. 8, FIG. 12 shows the sludge chamber of FIG. 10 in the closed position, FIG. 13 is a view in section taken along line XIII—XIII in FIG. 12, FIG. 14 is a lateral sectional view of a module-type intermediate plate for increasing the number of sludge chambers, FIG. 15 is a view in section taken along line XV—XV in FIG. 12, FIG. 16 is a lateral view in section of a practical embodiment as can be used for carrying into effect the method as shown in FIGS. 2 through 4, FIG. 17 is a view in horizontal section of the apparatus shown in FIG. 16, FIGS. 18 and 18A are views in section in FIG. 16 in the plane of the locking latches and the stroke cylinders respectively, showing only those details, FIG. 19 is a view in section through FIGS. 16 and 17 respectively along line XIX—XIX, with the sludge chambers shown in the open condition, FIGS. 20 and 21 show the positions corresponding to those shown in FIG. 19 of the stroke cylinders and the locking latches respectively, the abutments and the hydraulic bed, FIG. 22 is a view in section taken along line XXII—XXII in FIGS. 16 and 17 respectively, with the sludge chamber being shown in the closed and locked position, FIGS. 23 and 24 are views corresponding to FIGS. 20 and 21 but illustrating the operating condition shown in FIG. 22, FIG. 25 is a view in section taken along line XXV—XXV in FIGS. 16 and 17 respectively, showing the condition involving the production of an additional mechanical water-removal pressure, FIGS. 26 and 27 are views corresponding to FIGS. 20 and 21 and FIGS. 23 and 24 respectively, but in the operating condition shown in FIG. 25, FIG. 28 is a view corresponding to FIG. 12 of a further form of the sludge chamber, of greatly simplified construction, FIG. 29 is a view of the sludge chamber in section taken along line XXIX—XXIX in FIG. 28, FIGS. 30(a), 30(b), 30(c), and 30(d) are views in section of the seal used in accordance with the invention in the embodiment of the apparatus shown in FIGS. 16 and 17, in four different operating conditions, and FIGS. 31(a), 31(b), and 31(c) are sectional views of the seal used in accordance with the invention in embodiments of the apparatus of the invention having more than one filter surface in the sludge chamber, in three different operating conditions.

DESCRIPTION OF PREFERRED EMBODIMENTS

To describe the various alternative forms of the method according to the invention reference is firstly directed to the diagrammatic views shown in FIGS. 1 through 4 showing different embodiments of the apparatus according to the invention for carrying out the method, in terms of the basic components thereof.

Figure 1:
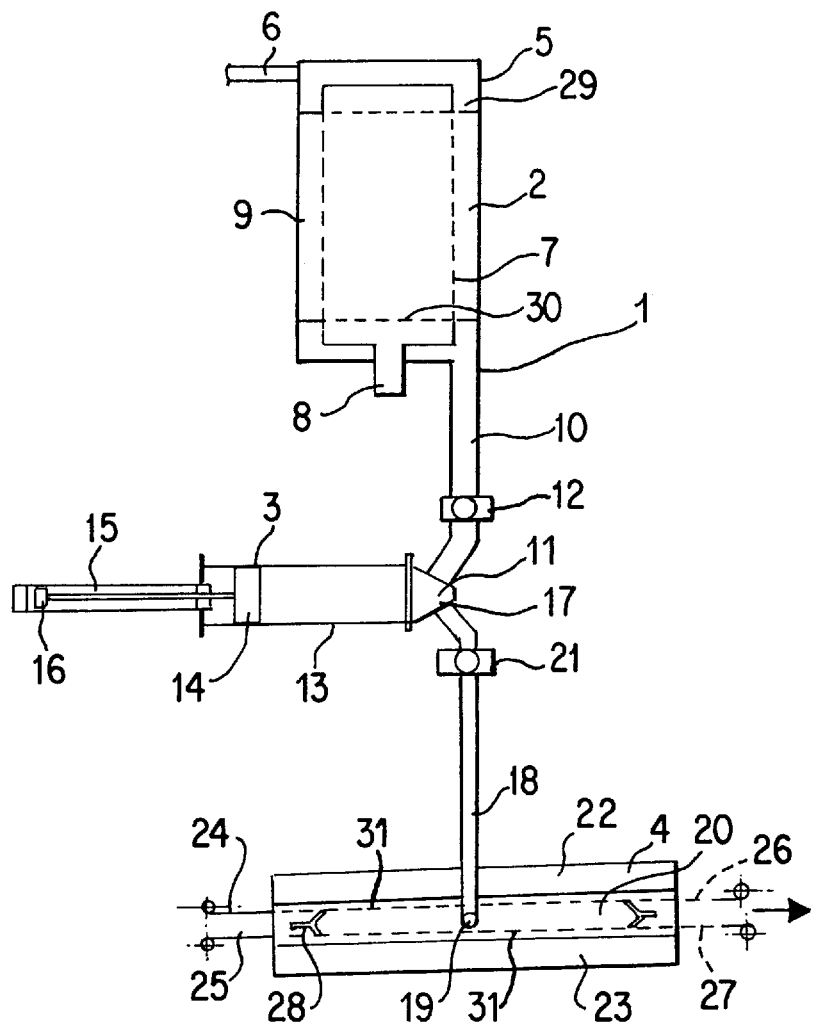

The fundamental principle of the method according to the invention is best shown in FIG. 1 to which reference is therefore now specifically directed.

The apparatus which is illustrated in FIG. 1 and which is generally identified by reference numeral 1 comprises three main components, namely a preliminary water-removal stage 2, an intermediate container 3 and a filter press 4.

The preliminary water-removal stage 2 comprises a compensating or equalizing chamber 5 which is connected to a continuous sludge feed as indicated at 6. Arranged in the compensating container 5 is a filter cage or basket 7 having a filtrate outlet 8. The filter basket 7 is immersed in the sludge 9 which is fed into the container 5.

At its lower end the compensating container 5 has a sludge outlet line or conduit 10 which is connected to a sludge inlet 11 of an intermediate container 13. Disposed in the sludge outlet line 10 is a shut-off or control valve 12 which can be operated to interrupt the feed of sludge to the intermediate container 3.

The intermediate container 3 is designed in the manner of a large injection syringe, as a piston-cylinder unit, comprising a cylinder housing 13 and a piston 14 which is displaceable in the cylinder housing 13 and which is connected by its piston rod (not referenced) to a drive 15 which in the illustrated embodiment is formed by a hydraulic or pneumatic actuating piston 16.

The intermediate container 3 has a sludge outlet 17 which is connected by way of a line or conduit 18 to a sludge inlet 19 of a sludge chamber 20 of the filter press 4, a further shut-off or control valve 21 being disposed in the line 18. The sludge chamber 20 of the filter press 4 is arranged between an upper pressure plate 22 and a lower pressure plate 23. The pressure plates 22 and 23 can be adapted to be movable individually in a vertical direction or both plates can be adapted to be so movable.

The sludge chamber 20 is formed by an upper filter surface 24 and a lower filter surface 25 which comprise an upper filter belt 26 and a lower filter belt 27 which are movable with a reciprocating rectilinear movement in a horizontal direction. Provided between the filter belts 26 and 27 is a seal 28 which encloses the sludge chamber 20 therearound and which, when the sludge chamber is in the closed condition, bears sealingly against the two filter belts 26 and 27. Disposed above the upper filter belt 26 and below the lower filter belt 27, between the pressure plates 22, 23 and the filter belts 26, 27, are respective mounting or support plates 31 which, on the side of the filter belts 26, 27, have open passages or grooves which serve to drain away the filtrate which issues through the filter belts. This will be described in greater detail hereinafter with reference to the various embodiments of the apparatus according to the invention.

In the method according to the present invention sludge from which water is to be removed is continuously fed through the continuous sludge feed 6 into the compensating chamber 5. Depending on the operating condition involved, an upper sludge level 29 or a lower sludge level 30 can occur, corresponding to the respective maximum and minimum conditions of operation. In the compensating container 5 the continuously supplied sludge is subjected to continuous preliminary removal of water under the effect of the force of gravity, with the resulting filtrate being removed from the filtrate outlet 8 of the filter basket or cage 7. In that way the sludge 9 already has a content of dry substance of about 20% at the sludge outlet line 10.

A supply of sludge is intermittently transferred in a portion-wise manner into the intermediate container 3 by the control valve 12 which is preferably in the form of a globe valve being opened and by the piston 14 being moved from its forward position rearwardly by the drive 15. That operation for filling the intermediate container 3 can be effected extremely slowly and carefully so that the flocculated nature of the sludge is still maintained. In that respect the intermediate container 3 accommodates a supply amount of sludge which approximately corresponds to one and a half times the volume of the sludge chamber 20. After the intermediate container 3 is completely filled the control valve 12 is closed and then the control valve 21 is opened. Thereafter the volume of sludge contained in the intermediate container 3 is positively displaced out of the intermediate container 3 by the piston 14 being moved into its forward position by actuation of the drive 15. During that forward movement a hydrostatic pressure is already built up in the sludge chamber 20 as the volume content of the intermediate container 3 is larger than the volume content of the sludge chamber 20. Preferably the control valve 21 is then again closed and the control valve 12 opened, and the piston 14 is moved into its rear position again by actuation of the drive 15 so that the intermediate container 3 is again filled with sludge. Then, once again the control valve 12 is closed and the control valve 21 is opened and the piston 14 is again moved forwardly so that an increased hydrostatic pressure which is preferably up to about 5 bars is built up in the sludge chamber 20 by virtue of that movement, with positive displacement of the contained volume of sludge. After the desired hydrostatic pressure has been achieved in the sludge chamber 20 the control valve 21 is closed again and, by virtue of opening of the control valve 12, the intermediate container 3 is again completely filled and is then ready for the next cycle. At the same time, by suitable movement of the movable pressure plate and/or plates 22 and/or 23, the sludge chamber 20 is opened and the sludge cake produced therein is removed from the sludge chamber 20 by horizontal movement of the filter belts 26, 27.

Cleaning of the filter belts 26 and 27 is effected by means of washing nozzles which are disposed at both sides of the assembly, while the filter belts are being moved back again into their starting position, whereafter the sludge chamber is closed again and thereupon the above-described cycle can be repeated.

Figure 2:
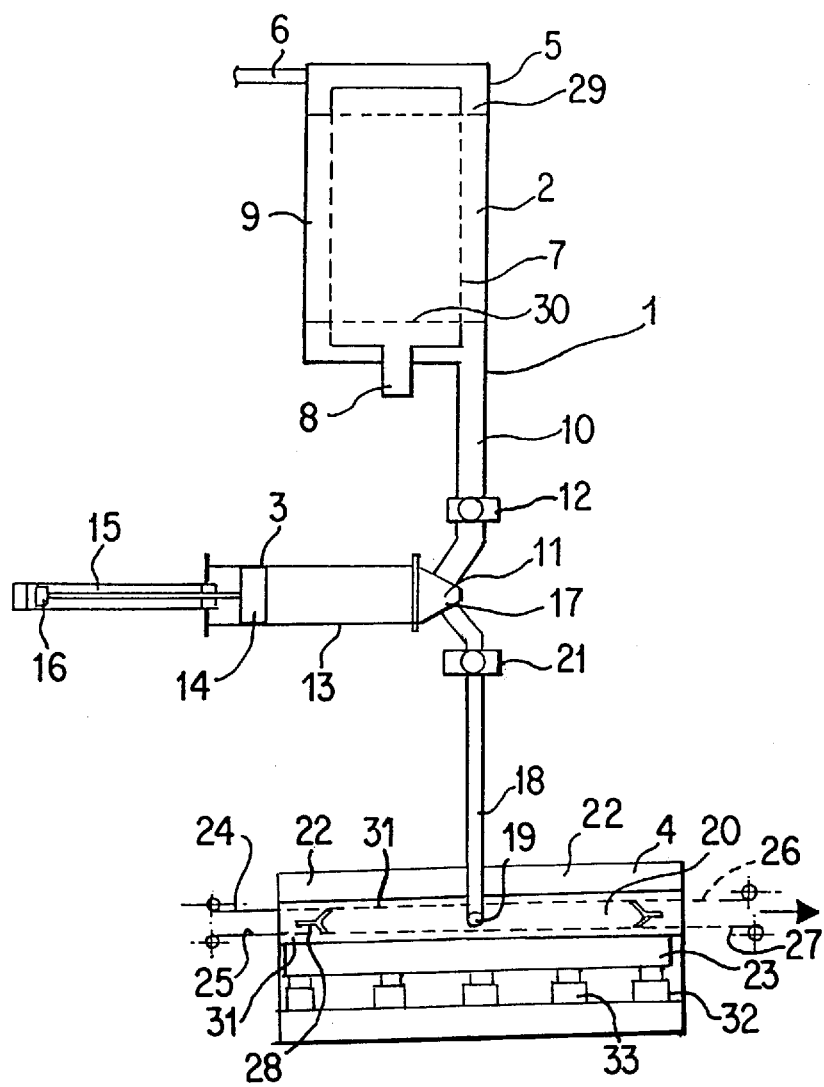

The embodiment shown in FIG. 2 corresponds in respect of its technical features to the construction described above with reference to FIG. 1 so that the same reference numerals have been used to denote parts which are the same or which operate in the same manner. It is only the filter press 4 which is of a different configuration in comparison with the embodiment shown in FIG. 1, in order to make it possible to carry out an additional method step.

As illustrated, in the embodiment in FIG. 2 the lower pressure plate 23 is mounted on a hydraulic bed 32 comprising a plurality of high pressure-producing devices 33 which act from below on the pressure plate 23. In this alternative form of the method according to the invention, after the desired hydrostatic pressure has been reached in the sludge chamber 20 and the control valve 21 has been closed, the volume of the sludge chamber 20 is reduced by actuation of the high pressure-producing devices 33, by a procedure whereby they press the upper pressure plate 23 upwardly towards the upper pressure plate 22. In that way, a mechanical water-removal pressure is produced, which can be for example of the order of magnitude of 30 bars and which is consequently higher than the previously attained hydrostatic pressure. This mode of operation makes it possible to achieve a considerable further increase in the content of dry substance in the filter cake produced.

After the additional operation of removing water by means of the mechanical water-removal pressure has been carried into effect, the high pressure-producing devices 33 are then relieved of load and the sludge chamber 20 is opened and the resulting filter cake is in turn removed from the sludge chamber by horizontal displacement of the filter belts 26 and 27. The sludge chamber is then closed again and the above-described cycle can begin afresh.

Figure 3:
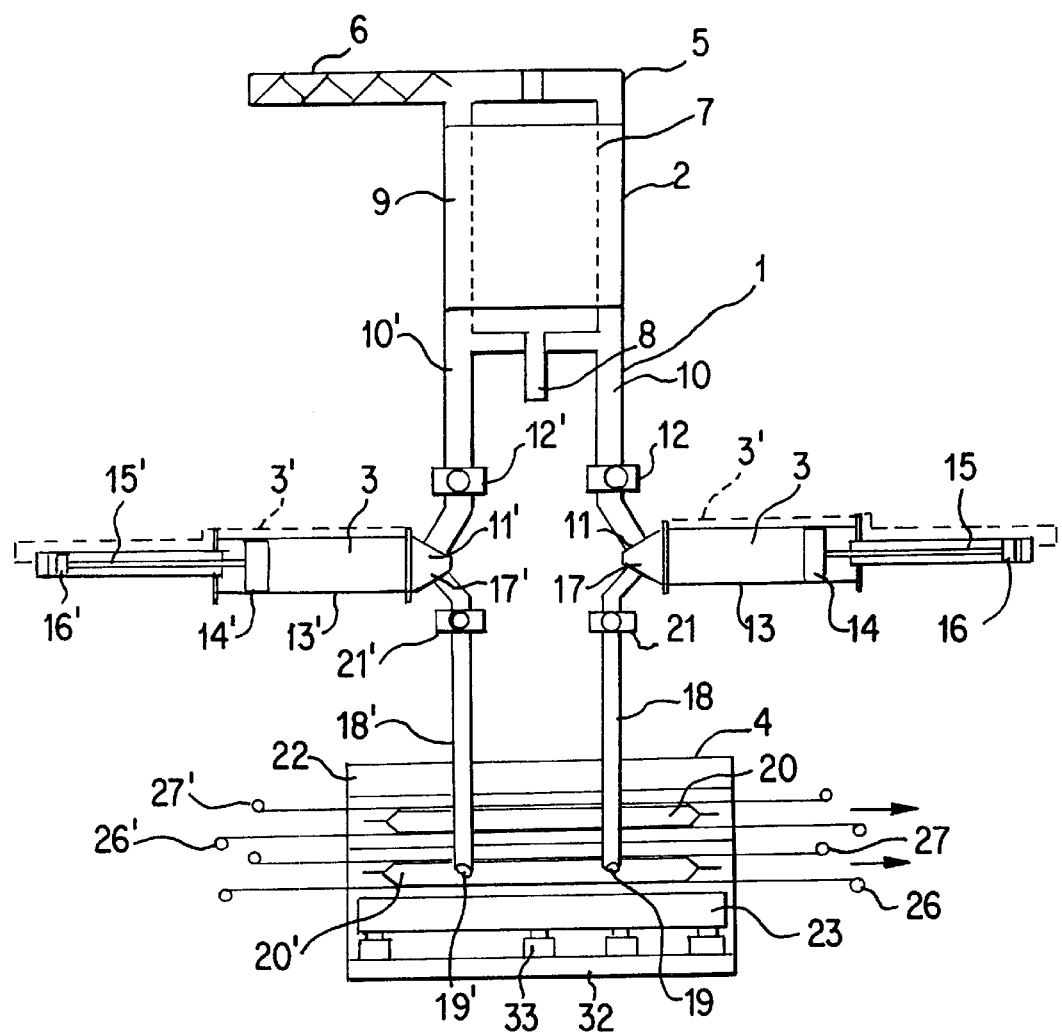

Reference will now be made to FIG. 3 showing an embodiment of the method and apparatus of the invention which in substance corresponds to that shown in FIG. 2, but with the difference that on the one hand water is simultaneously removed in a plurality of sludge chambers 20 arranged in mutually superposed relationship, and on the other hand the sludge is simultaneously introduced at a plurality of points in the sludge chambers 20 from a corresponding number of intermediate containers and consequently also the hydrostatic pressure is built up from a plurality of points in the individual sludge chambers 20. In regard to the structural details involved, attention is directed to the further description hereinafter of the various embodiments of the apparatus according to the invention. In the view shown in FIG. 3 the reference numerals denoting the individual parts which have been multiplied to correspond to the number of sludge chambers have merely been provided with a prime, while the intermediate containers 3 which supply the upper sludge chamber 20 are shown in broken lines.

Figure 4:
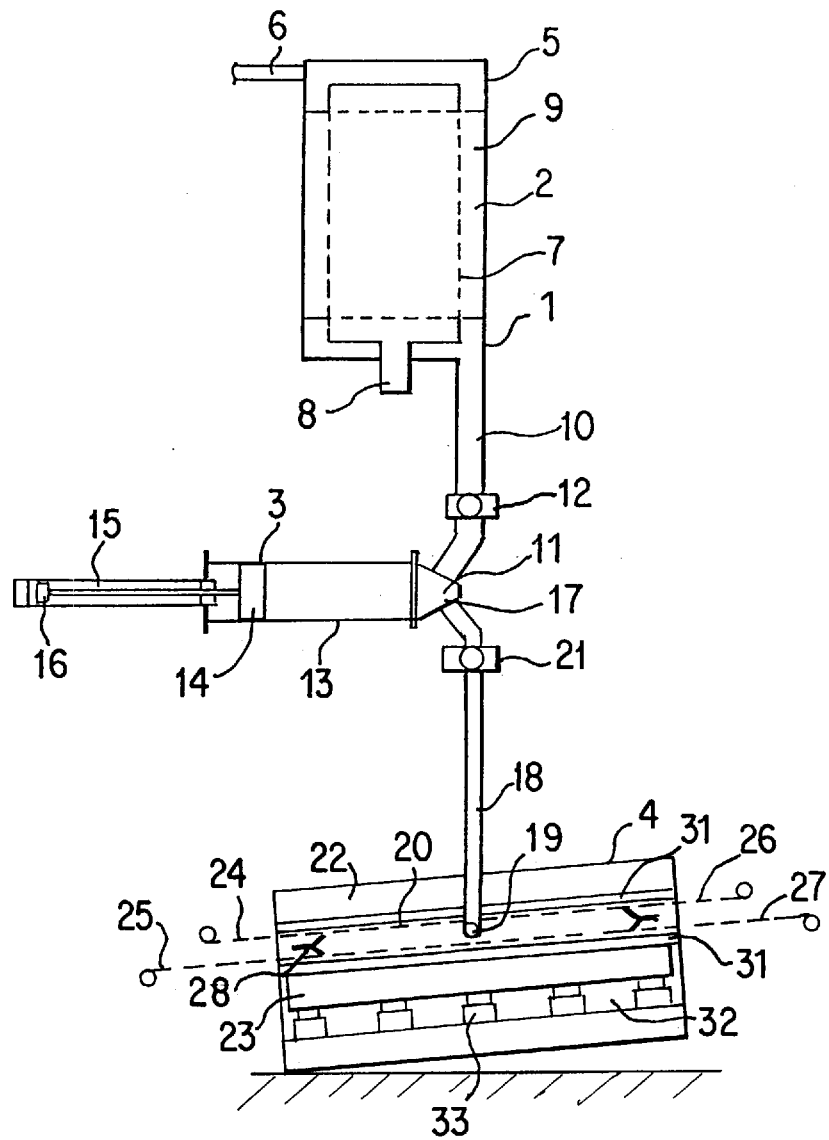

The embodiment shown in FIG. 4 corresponds in terms of its essential details to the embodiment shown in FIG. 2 so that once again the same references have been employed to denote parts which are the same or which have the same action. The only difference is that in this embodiment the sludge chamber 20 with the corresponding filter surfaces 25, 26 is arranged inclinedly relative to the horizontal, so that the filtrate which issues from the filter belts 26 and 27 at top and bottom and which collects in the open passages or grooves in the mounting or support plates 31 can be continuously conveyed away under the effect of the force of gravity.

For the purposes of describing a first practical embodiment of the apparatus according to the invention, reference will now be made hereinafter to FIGS. 5 through 13. These Figures are concerned with technical features and details of the preliminary water-removal stage 2, the intermediate container 3 and the associated filter press 4 connected to the one or more intermediate containers 3.

Figure 6:
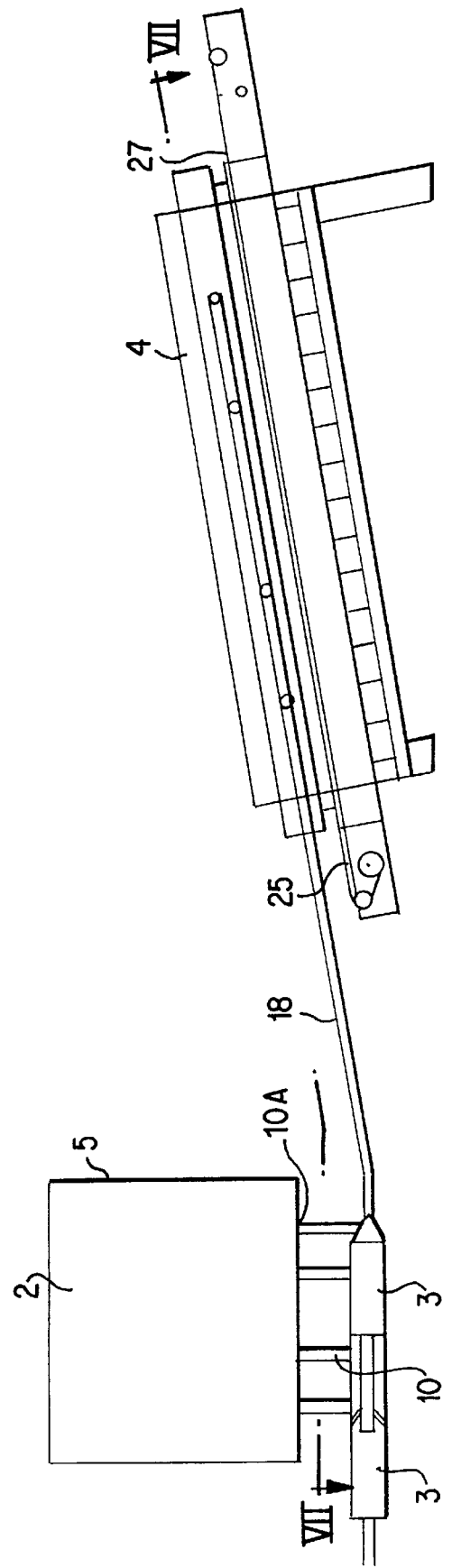
Figure 7:
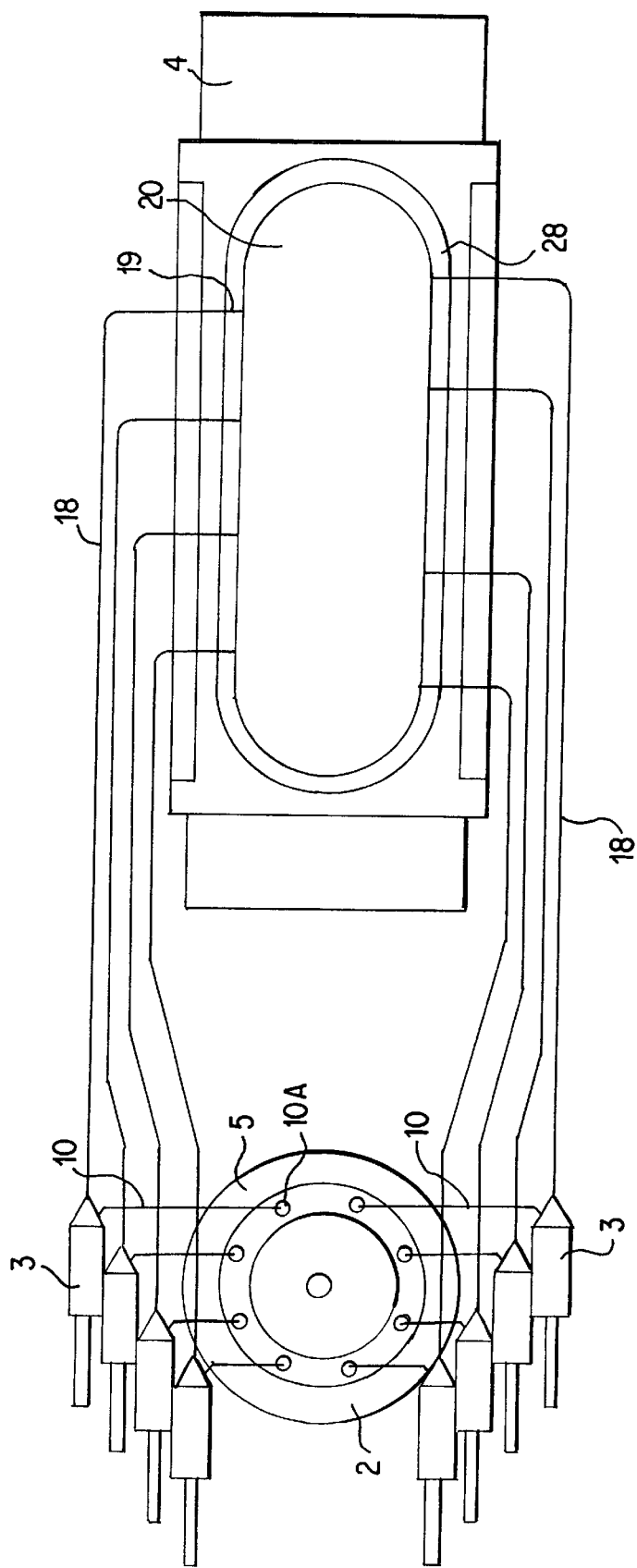
Figure 8:
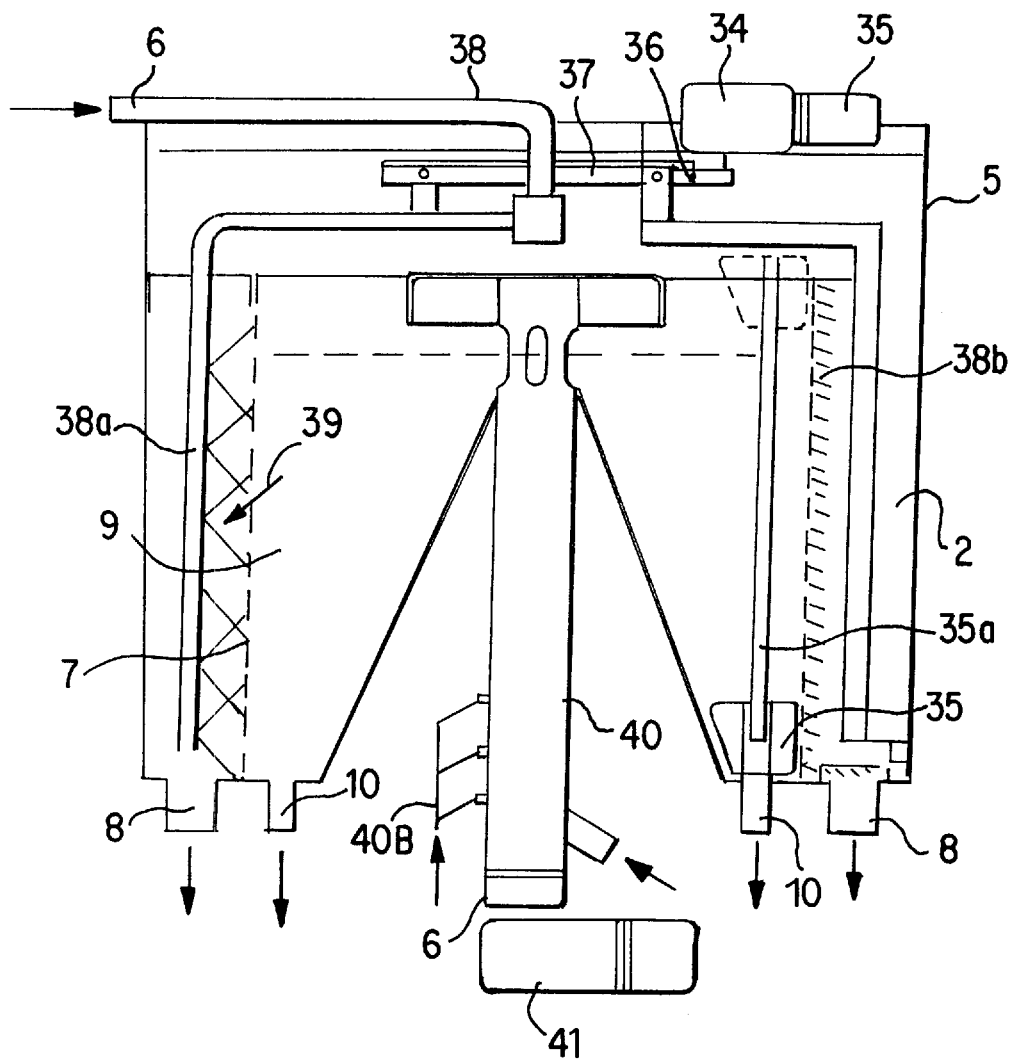

As shown in FIGS. 5 through 8 and in particular in FIG. 8, in a first embodiment of the apparatus according to the invention, a filter cage or basket 7 is provided in the compensating container 5 of the preliminary water-removal stage 2. Provided on the outside of the filter basket or cage 7 is a washing device 38 comprising washing nozzles 38a and at least one brush 38b which extends over the height of the filter cage 7. Further provided on the inside of the filter cage 7 is a stripper or scraper device 35 which can be moved up and down over the height of the filter cage 7 on a rod or bar 35a. The unit consisting of the washing device 38 and the scraper 35 is driven in rotation by way of a rotary drive 34 so that both the outside and the inside of the filter cage 7 which is of a cylindrical configuration can be thoroughly cleaned by rotary movement of the unit 38, 35 and the upward and downward movement of the scraper 35. The scraper 35 serves in that respect primarily to periodically clean the end portion and the sludge outlets of the filter cage. In the illustrated embodiment the drive 34 is formed by an electric motor 34a and a spur gear transmission 36. The brushes 35b of which preferably three portions are disposed in distributed array around the periphery of the filter cage or basket 7 rotate slowly and continuously around the filter cage, in which case the bristles of the brushes repeatedly pass into the filter openings and activate the water removal effect.

Figure 5:
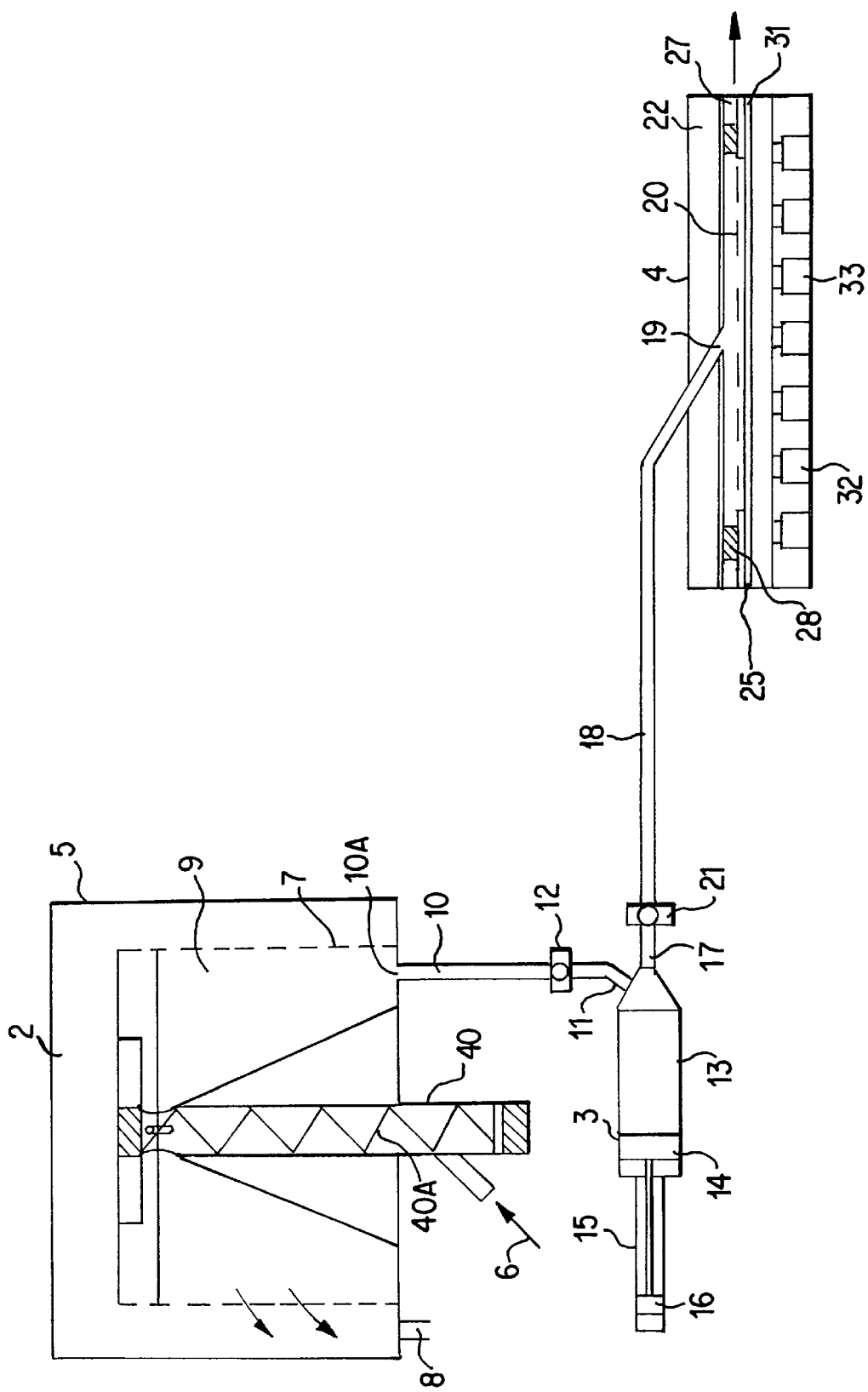

The filtrate which flows out of the filter cage 7 as indicated by the arrows 39 in FIGS. 5 and 8 is drained to the exterior through the filtrate outlet 8 provided in the bottom of the compensating container 5. The sludge 9 in the interior of the filter basket 7, from which the water has been partially removed, can be drawn off in a portion-wise manner through a number of sludge outlet lines 10, under the control of a corresponding number of shut-off valves 12, into the corresponding number of intermediate containers 3.

As can be seen from FIGS. 5 and 8, in this embodiment the continuous feed of sludge is formed by a mixer 40 which is charged by a continuously operating pump and which is driven by a motor 41 and which continuously feeds the sludge into the compensating container 5. The mixer 40 is arranged in an upright position and mixes the sludge with the flocculation agent which is added through the metering device 40B. For the mixing effect itself the mixer 40 has a mixing and conveyor screw as diagrammatically indicated at 40A in FIG. 5.

Still looking at FIGS. 5 through 8, provided in the bottom of the compensating container 5 of the preliminary water-removal stage 2 are a number of sludge outlets 10A which are connected by way of the sludge outlet lines 10 to the sludge inlets 11 of the intermediate containers 3. The number of sludge outlets 10A, the sludge outlet lines 10 and the intermediate containers 3 corresponds to the number of sludge inlets 19 of the sludge chamber 20, as can best be seen from FIG. 7.

In the embodiment as is shown in FIG. 7 in a horizontal view in section in the plane of the sludge chamber 20, the sludge chamber 20 has a total of eight sludge inlets 19 which are each individually connected by way of eight lines 18 to eight intermediate containers 3. The eight intermediate containers 3 are overall of a volume corresponding to one and a half times the volume of the sludge chamber 20.

Figure 9:
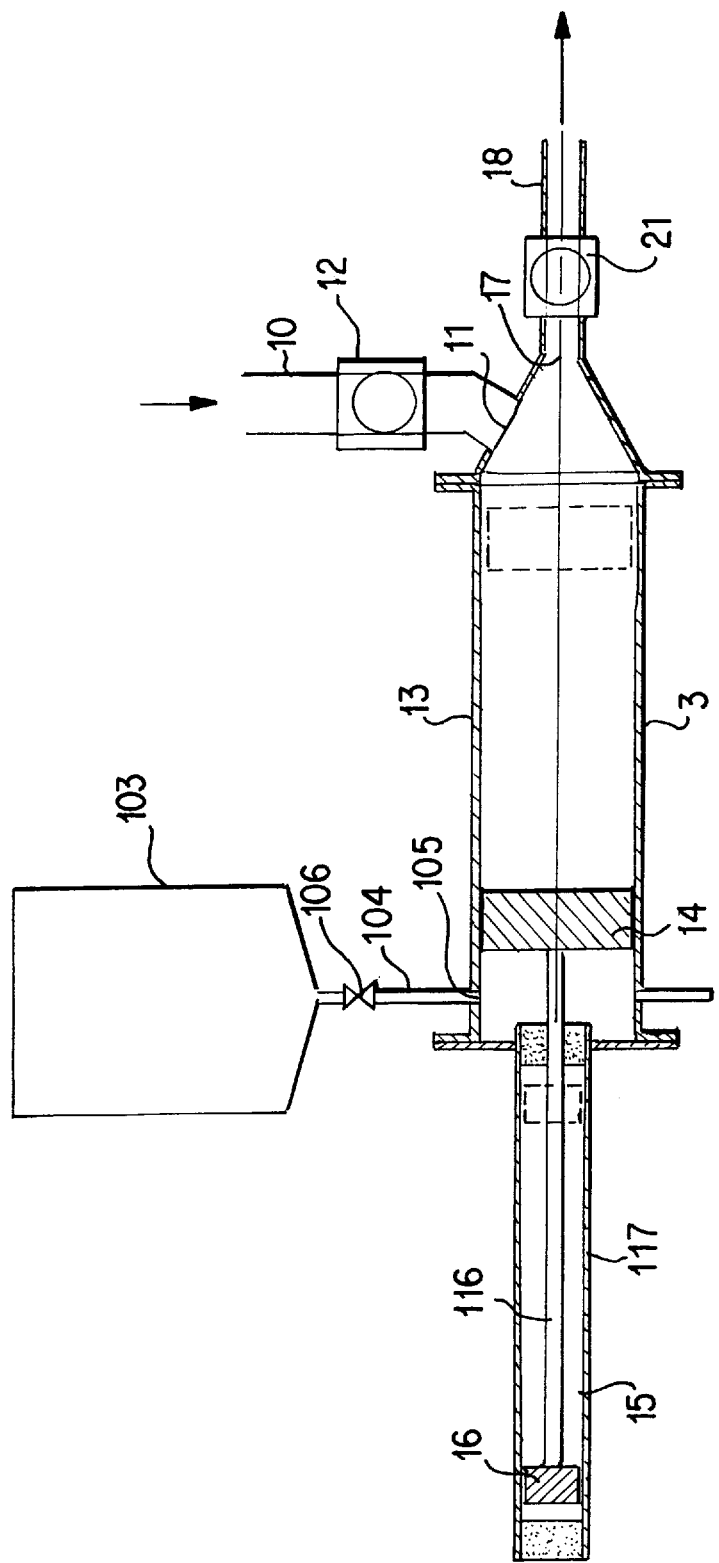

Reference is now directed to FIG. 9 showing one of the intermediate containers 3 in greater detail. As illustrated the intermediate container 3, in terms of its basic principle, is designed in the manner of a large injection syringe insofar as it is formed by a piston-cylinder unit 13, 14. Provided at the front end of the cylinder 13 of the intermediate container 3 is the sludge inlet 11 which is in communication with the sludge outlet line 10 and upstream of which is arranged the shut-off and control valve 12. In the embodiment illustrated in FIG. 9 the valve 12 is in the form of an electrically or hydraulically controlled globe valve in order to ensure that the flocculated sludge is conveyed as carefully and as gently as possible, in other words, without any disturbances therein or changes in crosssection. Also provided in the front end of the cylinder 13 is the sludge outlet 17 of the intermediate container 3, which communicates with the line 18 and associated with which is the second shut-off and control valve 21. The valve 21 is also in the form of an electrically or hydraulically controlled globe valve.

The piston 14 is arranged for reciprocating movement in the cylinder 13, to provide for positive displacement of the sludge volume in the intermediate container 3. The piston 14 has the drive 15 formed by a hydraulic or pneumatic actuating piston 16 which is arranged displaceably in a cylinder 117 and which is connected to the piston 14 by way of its piston rod 116.

As the flocculated sludge accommodated in the intermediate container may contain aggressive or abrasive constituents, the embodiment shown in FIG. 9 additionally has a lubricant container 103 which is connected by way of a line 104 to an inlet 105 into the cylinder 13, which is on the rear side of the piston 14. A valve 106 is additionally provided for maintenance operations.

In this respect the arrangement is such that, when the piston 14 is moved forwardly, that is to say towards the right in FIG. 9, by the drive 15, and displaces the volume of sludge out of the intermediate container 3, at the same time lubricant is sucked in on the rear side of the piston 14 from the lubricant container 103 so that the cylinder 13 is continuously lubricated. When the control valve 12 opens and the control valve 21 is closed and the piston 14 is moved rearwardly, that is to say towards the left in FIG. 9, and a fresh volume of sludge is sucked into the intermediate container 3 from the compensating container 5, the lubricant which is disposed in the cylinder 13 behind the piston 14 is displaced back into the lubricant container 103.

The filter press 4 shown in FIGS. 5 through 8 is described in greater detail hereinafter in connection with FIG. 5, with particular reference being directed to FIGS. 16 and 17.

Reference is made at this point to FIGS. 10 through 15 showing detail features of the filter press 4 which constitutes part of the preliminary water-removal stage 2 and the intermediate containers 3 shown in FIGS. 5 through 9 and whose basic structure corresponds to the mode of operation shown in FIG. 1, although FIGS. 14 and 15 show the technical options involved for increasing the number of sludge chambers 20.

Figure 10:
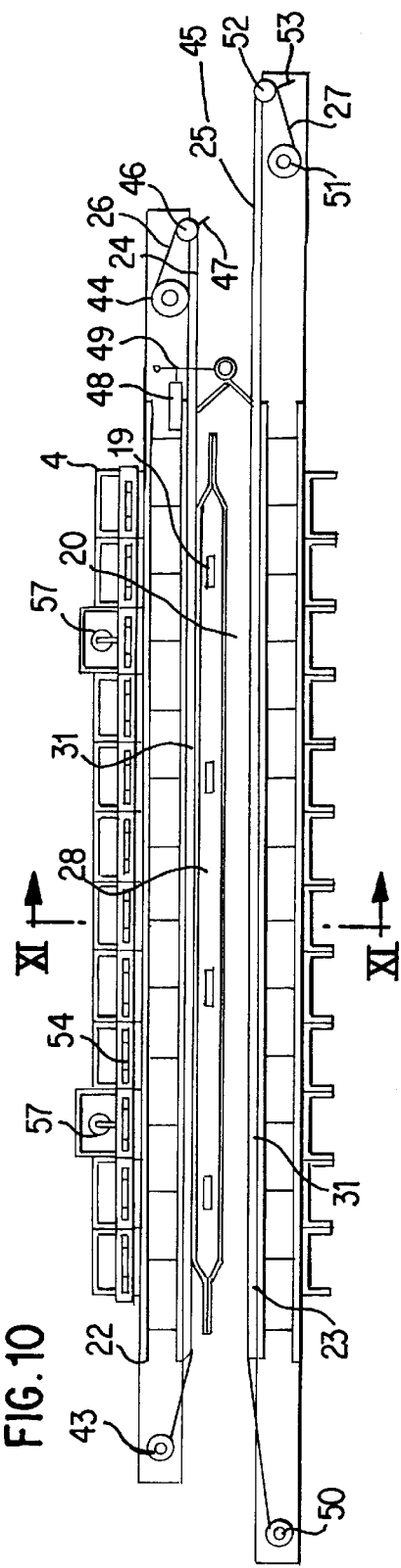
Figure 11:
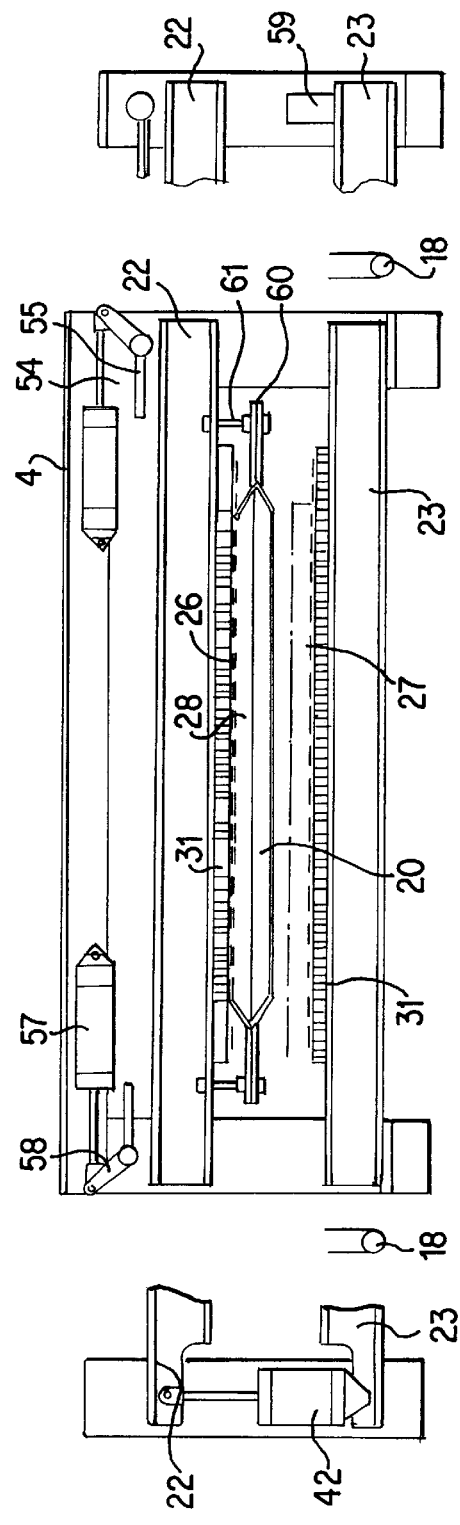
Figure 12:
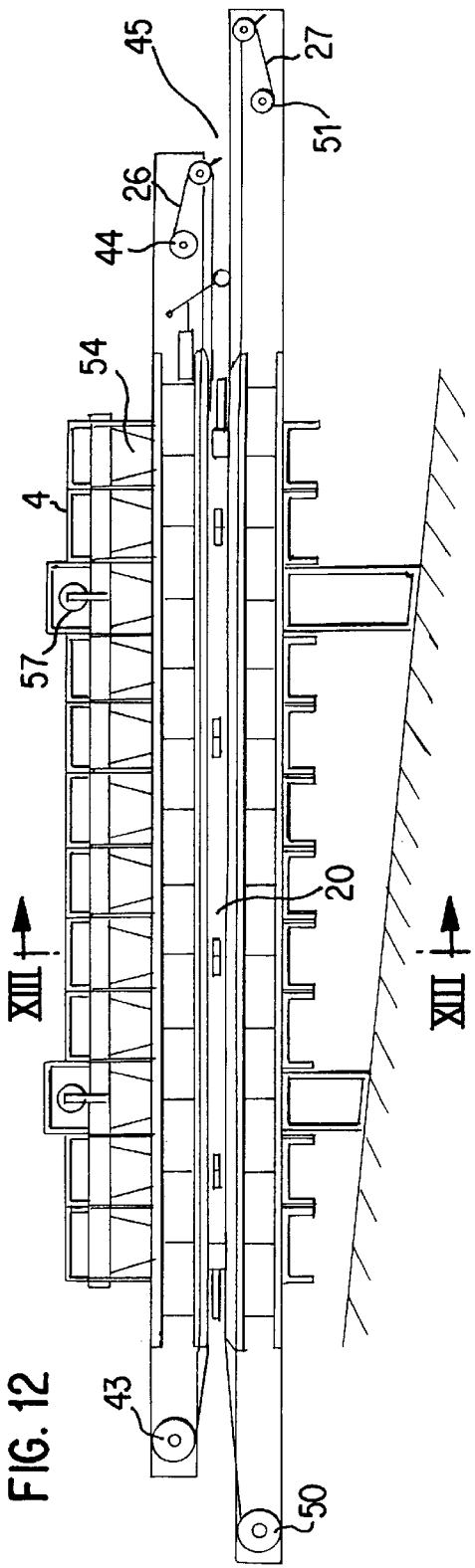
Figure 13:
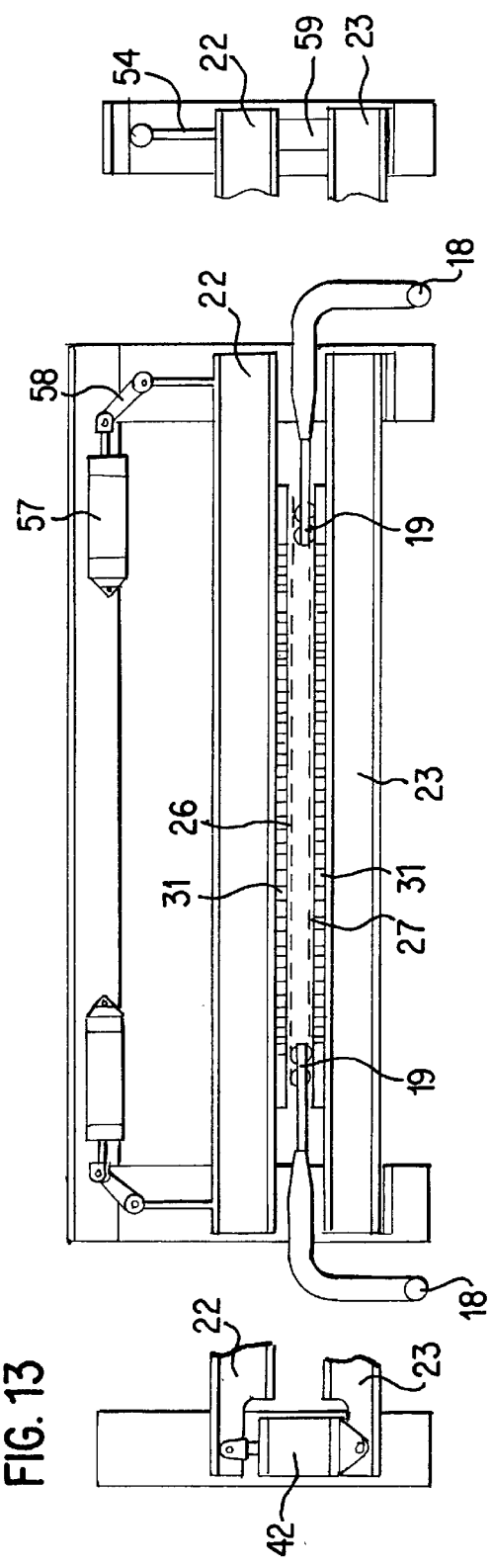

FIGS. 10 through 13 show the filter press 4 in the two basic positions thereof, namely on the one hand the opened position as shown in FIGS. 10 and 11 for discharge of the filter cake and cleaning of the filter surfaces, and on the other hand the closed position as shown in FIGS. 12 and 13, in which the sludge chamber is filled and the operation of removing water from the sludge is being carried out under hydrostatic pressure, in accordance with the operating procedure shown in FIG. 1.

As illustrated, the filter press shown in FIGS. 10 through 13 has the upper pressure plate 22 and the lower pressure plate 23. The upper pressure plate 22 can be raised and lowered relative to the lower pressure plate 23 by the operation of stroke cylinders 42, as shown in FIG. 11.

The respective mounting plate 31 is fixed to the upper pressure plate 22 and the lower pressure plate 23 on the respective side thereof which is towards the sludge chamber 20. Each mounting plate 31 has passages 75 which are open in the direction of the sludge chamber 20, for removal of the filtrate. The mounting plates 31 preferably comprise a low-friction plastic material as the filter belts 26 and 27 forming the upper and lower filter surfaces 24 and 25 slide on the mounting plates 31.

In all the embodiments illustrated the passages 75 in the mounting plates 31, which are only diagrammatically illustrated in the drawings, are arranged in such a way that they extend in a straight line in the longitudinal direction of the sludge chambers 20 in parallel relationship with the main axis. As a result of the slope or fall, that arrangement ensures that the filtrate which collects in the passages 75 is conveyed away in the opposite direction to the discharge direction of the filter press at the end of the mounting plates 31, under the action of the force of gravity.

In the illustrated embodiment the filter belts 26 and 27 are adapted to be movable horizontally with a reciprocating movement. The upper filter belt 26 is held at each of its two ends by a reversible winding drive 43, 44 so that the filter belt 26 is wound on the one hand on to the left-hand winding drive 43, in other words the filter surface 24 is moved into the sludge chamber 20, while in the reverse case the filter belt 26 is wound on to the right-hand winding drive 44, that is to say the filter surface 24 is moved out of the sludge chamber 20. In the case of the winding drive 44 which is disposed at the discharge end 45 of the filter press 4, the filter belt 26 is also passed around a direction-changing or guide roller 46 with which there is associated a stripper or scraper 47 which, when the filter cake is discharged, strips off any filter cake residues which possibly adhere to the filter belt 26. Also provided at the upper pressure plate 22 is a washing nozzle 49 which is pivotable by way of a drive 48 and which, when the sludge chamber 20 is opened and in the reverse movement of the filter belts 26, 27 into the sludge chamber 20, after the filter cake has been thrown off, can be pivoted into the gap between the upper pressure plate 22 and the lower pressure plate 23 in order to wash the two filter belts 26 and 27. The lower filter belt 27 is also carried, in a manner corresponding to the upper filter belt 26, by two winding drives 50 and 51 which are operated synchronously with the winding drives 43 and 44. At the discharge end 45 of the filter press 4 the lower filter belt 27 is also passed around a direction-changing or guide roller 52 with a scraper or stripper 53.

As further illustrated the sludge inlets 19 into the sludge chamber 20 which are connected by way of a corresponding number of lines 18 to the likewise corresponding number of intermediate containers 3 are in the form of horizontal slit-like openings in the seal 28 which surrounds the sludge chamber 20. The slit-like configuration of the openings 19 can be clearly seen in FIG. 10.

As is further apparent from FIGS. 10 through 13 the sludge chamber 20 can be mechanically locked in the closed position so that there is no need to build up a counteracting pressure which is greater than or corresponds to the pressure required for removing water from the sludge. For locking purposes the filter press 4 of the apparatus according to the invention has a locking pawl or latch arrangement as generally indicated at 54 for example in FIG. 11, comprising a number of pivotable locking latches or pawls 55 mounted on a common shaft shown for example in FIG. 11 and indicated at 56 in FIG. 18, along both side edges of the filter press 4, wherein each of the shafts is pivotable by way of pneumatic cylinders 57 and a lever drive assembly 58 between an opened position as shown in FIGS. 10 and 11 and locked position as shown in FIGS. 12 and 13.

As can further be seen in particular from the detail in FIG. 11, the apparatus has stops or abutments 59 which are operative between the upper pressure plate 22 and the lower pressure plate 23 and which define the height of the closed sludge chamber 20, which is to be attained when the upper pressure plate 22 is in the lowered position relative to the lower pressure plate 23.

As is also shown in FIG. 12 the filter press 4 is preferably set up in such a way that the sludge chamber 20 is inclined relative to the horizontal, the inclination approximately corresponding to a fall in respect of the filter surfaces 24 and 25 of 5°. That ensures that the filtrate which passes into the passages in the mounting plate 31 out of the upper filter surface 24 is removed by virtue of the fall, in the water-removal operation.

In the embodiment shown in FIGS. 11 through 13 the sludge chamber is formed by the flexible seal 28 which surrounds the actual sludge chamber 20, and the region of the filter belts 26 and 27, which is enclosed by the seal. Detail features of the seal 28 itself will be discussed more fully hereinafter. As shown in FIG. 11 the seal 28 is carried by an auxiliary frame 60 which is suspended on the upper pressure plate in such a way as to be movable up and down by means of thrust rods 61. This form of suspension arrangement is appropriate so that the sludge chamber 20 can be securely closed when the upper pressure plate 22 is moved downwardly towards the lower pressure plate 23 until the abutments 59 are reached, by virtue of relieving the load of the stroke cylinders 42. The thrust rods 61 thus form entrainment members 62 which permit limited relative movement as between the upper pressure plate 22 and the seal 28.

Reference will now be made to FIGS. 14 and 15 showing a module-type component in the form of an intermediate plate 63, by means of which it is possible to increase the number of superposed sludge chambers 20 in the filter press 4 shown in FIGS. 10 through 13 and also in the embodiments described hereinafter, to afford any desired number of such sludge chambers. A further sludge chamber 20 is produced in each case by the insertion of a respective intermediate plate 63 as shown in FIGS. 14 and 15, between an upper pressure plate 22 and the corresponding lower pressure plate 23. As in practical use an intermediate plate 63 of that kind is loaded with the same pressure on both sides thereof as the same water-removal pressure is built up in the superposed sludge chambers 20, the carrier plate 64 of the intermediate plate 63 can comprise for example an open grating structure as only a certain level of compression strength is involved. As illustrated each intermediate plate comprises on its top side and underside a respective one of the mounting or support plates 31 on which an upper filter belt 65 and a lower filter belt 66 respectively slide. Also provided on the intermediate plate 63 for the filter belts are suitable winding drives 67, 68, 69 and 70 with associated direction-changing or guide rollers, scrapers and a washing device, which are identical to the corresponding components which have already been described above with reference to the upper and lower pressure plates 22 and 23 respectively.

Only the winding drives and the associated accessory components for the two filter belts 65 and 66 are arranged in the intermediate plate 63.

A seal 28 with an auxiliary frame 60 is also suspended by entrainment members 62 at the underside of the intermediate plate 63. The abutments 59 are further provided at the side edges of the intermediate plate 63.

The arrangement and the mode of suspension of the intermediate plate 63 is described in greater detail hereinafter with reference to FIG. 21.

Attention is now directed to FIGS. 16 through 27 showing a further practical embodiment of the apparatus according to the invention as is appropriate for carrying out the method described above with reference to FIGS. 2 through 4 and in particular FIG. 3.

Figure 16:
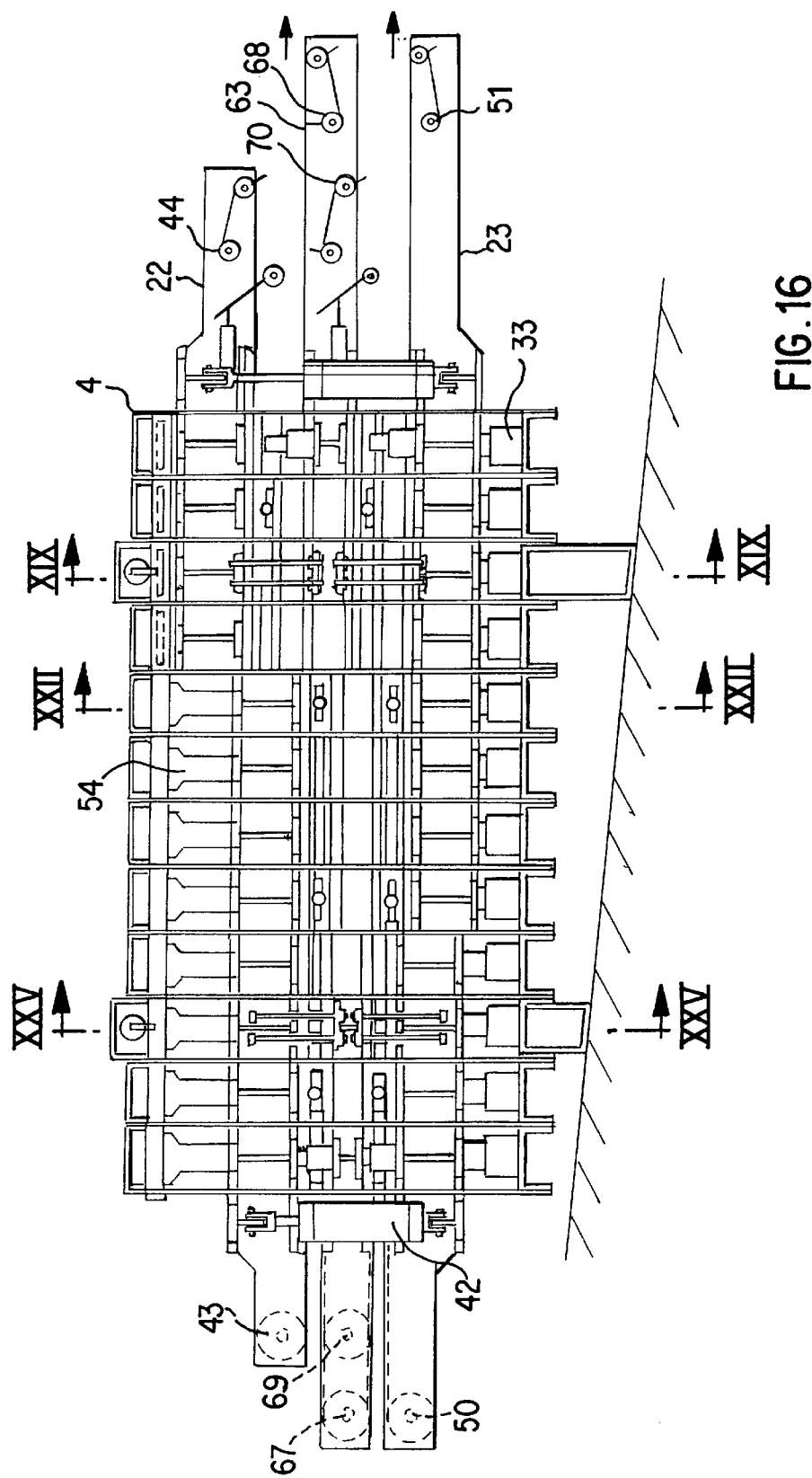

In this respect FIG. 16 is a side view in section of the filter press 4, in which case the preliminary water-removal device and the intermediate containers 3 can be designed as described above with reference to FIGS. 5 through 9. FIG. 16 further shows separately by means of the section lines XIX—XIX, XXII—XXII and XXV—XXV the various operating conditions and the correspondingly different positions of the individual components.

In this embodiment, components which are the same or which have the same action are denoted by the same references as in the foregoing description of the previous embodiments so that, in regard to technical details which do not need to be described fully once again at this stage, attention may be directed to the foregoing description of the first embodiment of the apparatus according to the invention.

In the present embodiment the lower pressure plate 23 is also designed to be movable and serves to produce an additional mechanical water-removal pressure by virtue of a reduction in the height of the sludge chambers 20 after the desired hydrostatic water-removal pressure has been attained, as is achieved by the displacement of the volume of the sludge in a forwards direction by means of the intermediate containers 3. For that purpose of producing the additional mechanical pressure, the lower pressure plate 23 is mounted on a number of the above-mentioned high pressure-producing devices 33 which, as in the embodiment shown in FIGS. 16 through 27, can either be arranged in two rows along the longitudinal edges of the lower pressure plate 23 or as described above, can be in the form of an assembly constituting a hydraulic bed 32.

Figure 17:
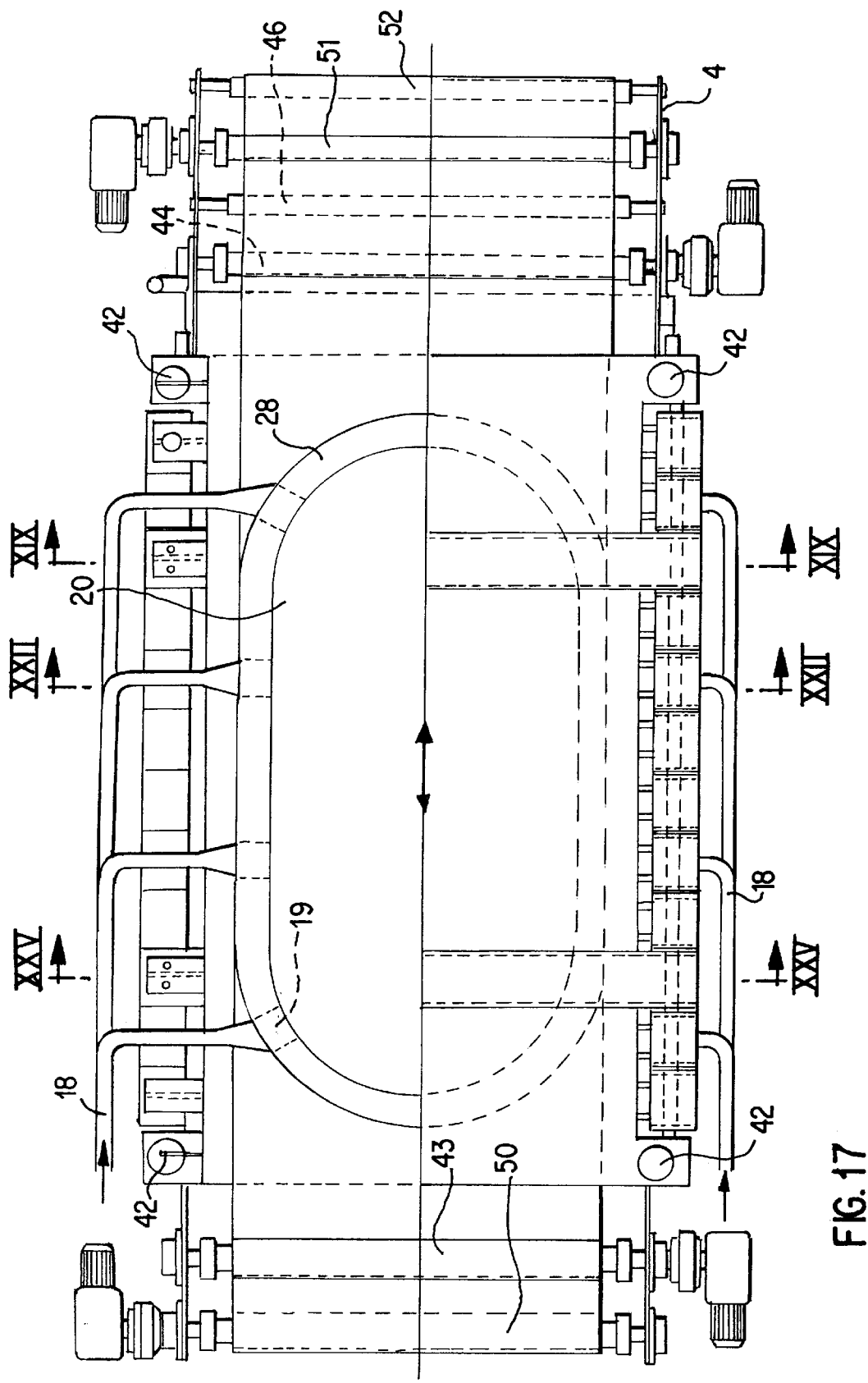

As can be seen from FIG. 17 each sludge chamber 20 is preferably of an oval configuration in contour so that there are no corners and the like with corresponding pressure peaks.

FIG. 17 further shows in the upper half thereof the way in which the sludge inlets 19 are arranged and formed in the seal 28, and also illustrates that associated with each of the sludge inlets 19 is a respective specific connecting line 18 which is separately connected to a sludge outlet 17 of an intermediate container 3.

Figure 19:
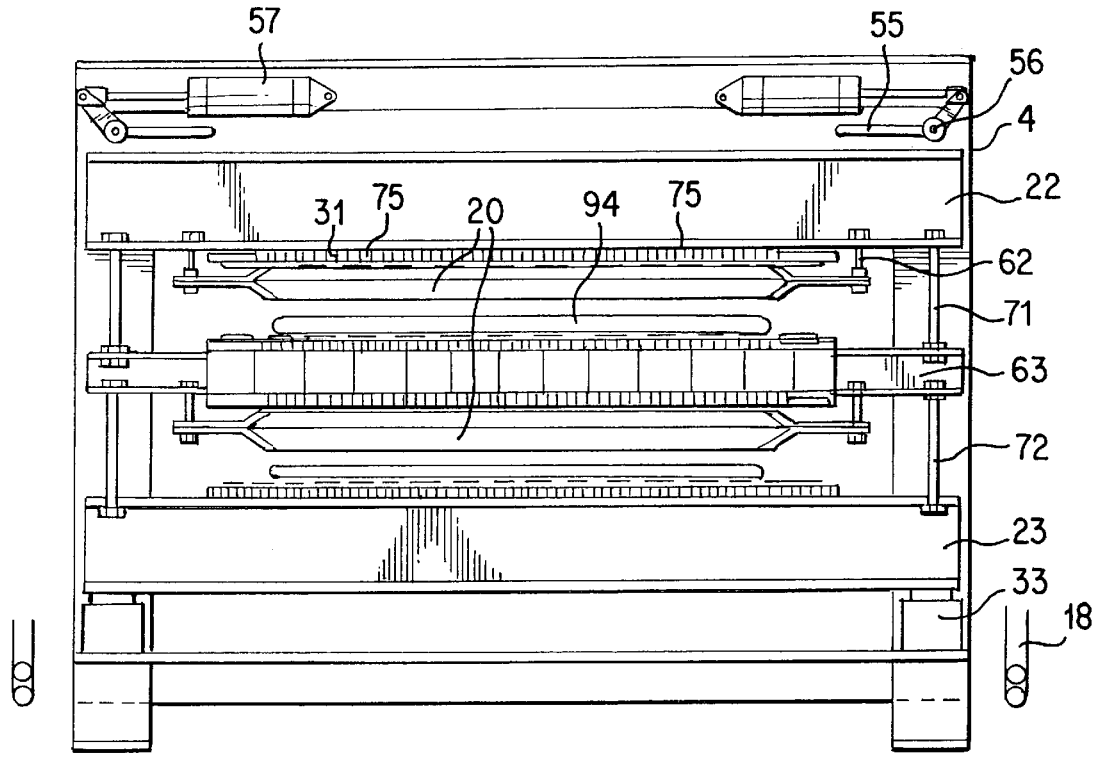
Figure 20:
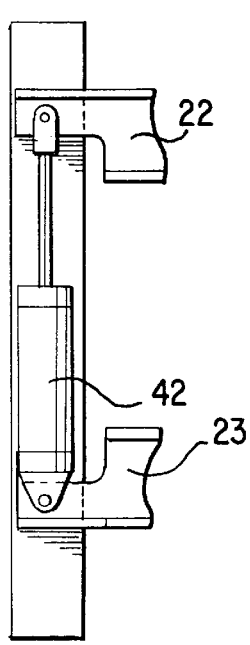

FIG. 19 further shows details of the installation of an intermediate plate 63. As illustrated the intermediate plate 63 is suspended from the upper pressure plate 22 by means of upper entrainment members 71 and is guided by means of lower entrainment members 72 which are connected to the lower pressure plate 23. As is apparent from the following description of the mode of operation of this arrangement, that way of installing the intermediate plate 63 permits the various relative movements of the individual parts with respect to each other.

Figure 21:
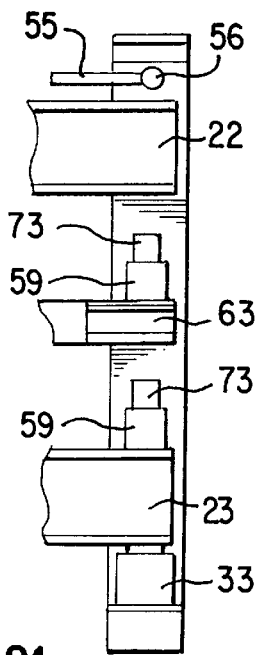

It will also be apparent from FIG. 21 that in this embodiment the abutments 29 are also adapted to the modified requirements of this embodiment, insofar as the abutments 59 have an upper portion 73 which either can be resiliently pressed into the abutment 59 or which forms part of a correspondingly downwardly movable hydraulic cylinder.

The mode of operation of the filter press 4 illustrated in FIGS. 16 through 27 will now be described in greater detail with reference to FIGS. 19 through 27.

FIGS. 19 through 22 show the opened condition of the sludge chambers 20, with the stroke cylinders 42 having moved the upper pressure plate 22 upwardly. The locking latches 55 are opened in that situation, by virtue of the locking latches 55 having been pivoted into the open position by actuation of the for example pneumatic cylinders 57.

When the upper pressure plate 22 is raised the seal 28 of the upper sludge chamber 20 was firstly lifted away from the top side of the intermediate plate 63 by the entrainment members 62 and then the entire intermediate plate 63 was moved upwardly away from the lower pressure plate 23 by the entrainment members 71, together with the seal 28 associated with the intermediate plate 63, with the associated seal 28 of the intermediate plate 63 also being entrained by the entrainment members 62 of the intermediate plate 63.

The high pressure-producing devices 33 were relieved of load at the same time so that, in the condition shown in FIG. 19, the lower pressure plate 23 has also moved downwardly, which was assisted by virtue of the fact that it does in fact carry the reaction forces of the cylinders 42.

In this condition the abutments 59 are also unloaded and adopt the position shown in FIG. 21 in which the upper portions 73 thereof define the height of the closed sludge chambers.

In this condition the filter press 4 is ready for the filter cake 74 formed in a preceding cycle to be discharged from the sludge chambers 20. For that purpose the winding drives 44, 51 and 68, 70 associated with the discharge end 45 of the filter press 4 are now actuated while the winding drives 43, 50 and 67, 69 associated with the other end of the filter press are released. The filter belts 26, 27 and 65, 66 are moved synchronously out of the sludge chambers 20 and, after the filter cakes 74 are thrown off, the winding drives 44, 51 and 68, 70 are released and the winding drives 43, 50 and 67, 69 are actuated so that the filter belts 26, 27 and 65, 66 are again moved synchronously back into the sludge chambers 20. At the same time the filter belts are cleaned by means of the washing nozzles 49. At the end of that procedure the filter press 4 is again in the condition shown in FIG. 19, but no filter cake 74 is contained in the sludge chambers 20.

Figure 22:
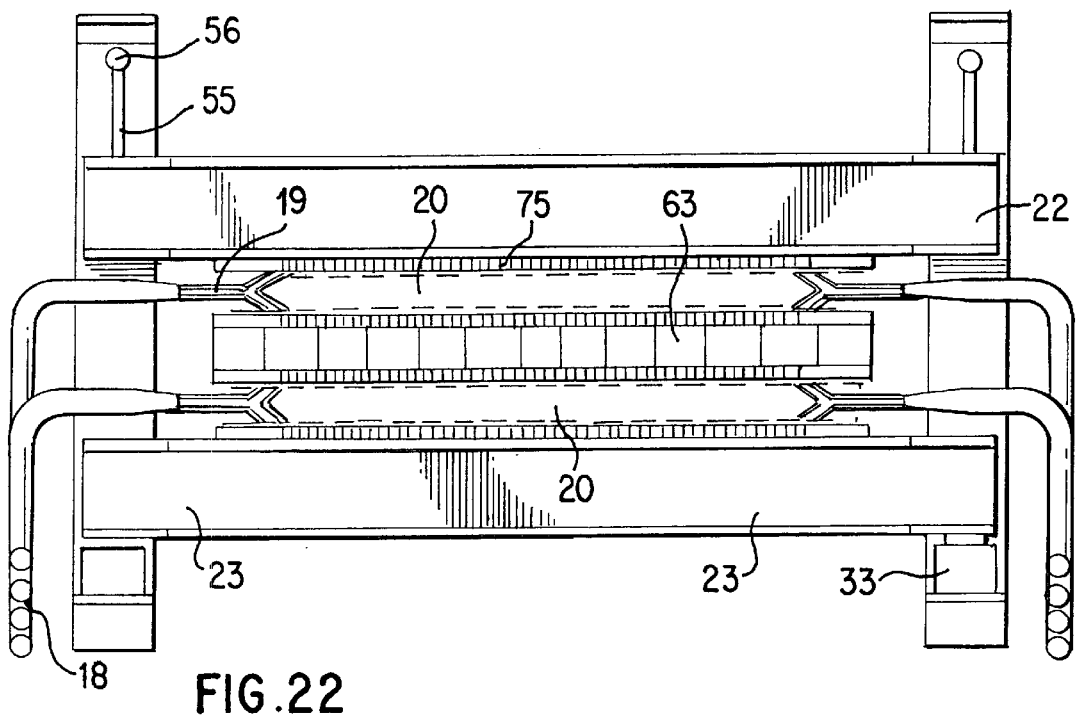
Figure 23:
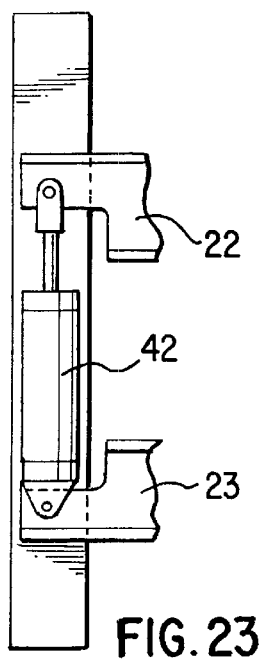
Figure 24:
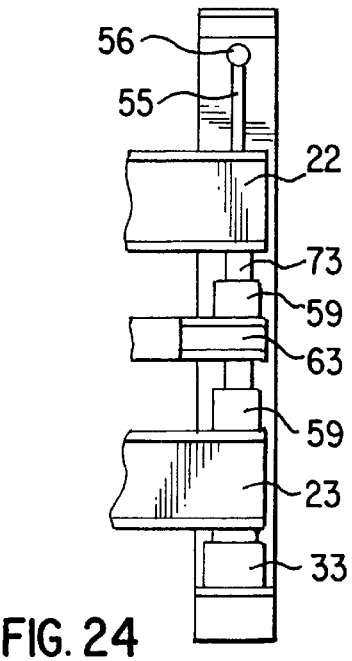

The filter press 4 is then put into the condition shown in FIGS. 22 through 24, with the sludge chambers 20 closed. For that purpose the cylinders 42 are relieved of load and the upper pressure plate 22 moves downwardly towards the lower pressure plate 23, entraining the seals 28 and the intermediateplate 63. The high pressure-producing devices 33 remain in the non-loaded condition.

The upper pressure plate 22 and the intermediate plate 63 are lowered until they come into engagement with the abutments 59 or more specifically the upper parts 73 thereof. In that condition the locking pawls 55 are locked by actuation of the for example pneumatic cylinders 57 and are pivoted into the position shown in FIG. 22 in which the spacing between the upper pressure plate 22 and the lower pressure plate 23 is mechanically fixed and defined by the abutments 59. In that condition the seals 28 of the sludge chambers 20 are sealingly compressed, wherein the upper sludge chamber 20 is closed at top and bottom by the filter belt 26 and the filter belt 65 of the intermediate plate 63, and the lower sludge chamber 20 is closed at top and bottom by the lower filter belt 66 of the intermediate plate 63 and the filter belt 27 of the lower pressure plate 23. In that condition the valves 12 which connect the intermediate containers 63 to the compensating container 5 are closed and the valves 21 are now opened so that the sludge in the intermediate containers 3 is fed into the sludge chambers 20 by movement of the pistons 14 and a hydrostatic water-removal pressure is built up.

With the rising pressure the filtrate contained in the sludge is urged outwardly through the filter belts 26, 27 and 65, 66 into the passages in the mounting plates 31 and is removed from the filter press 4 at the end thereof, in opposite relationship to the discharge direction, by virtue of the arrangement of the passages 75 in parallel relationship with the main axis of the sludge chamber 20 and by virtue of the fall due to the inclined positioning.

After the desired hydrostatic pressure is attained in the sludge chambers, for example after a pressure of 5 bars is reached, the valves 21 are closed again and then the valves 12 are opened, in which case the pistons 14 are retracted and a fresh volume of sludge is transferred into the intermediate containers 3.

Figure 25:
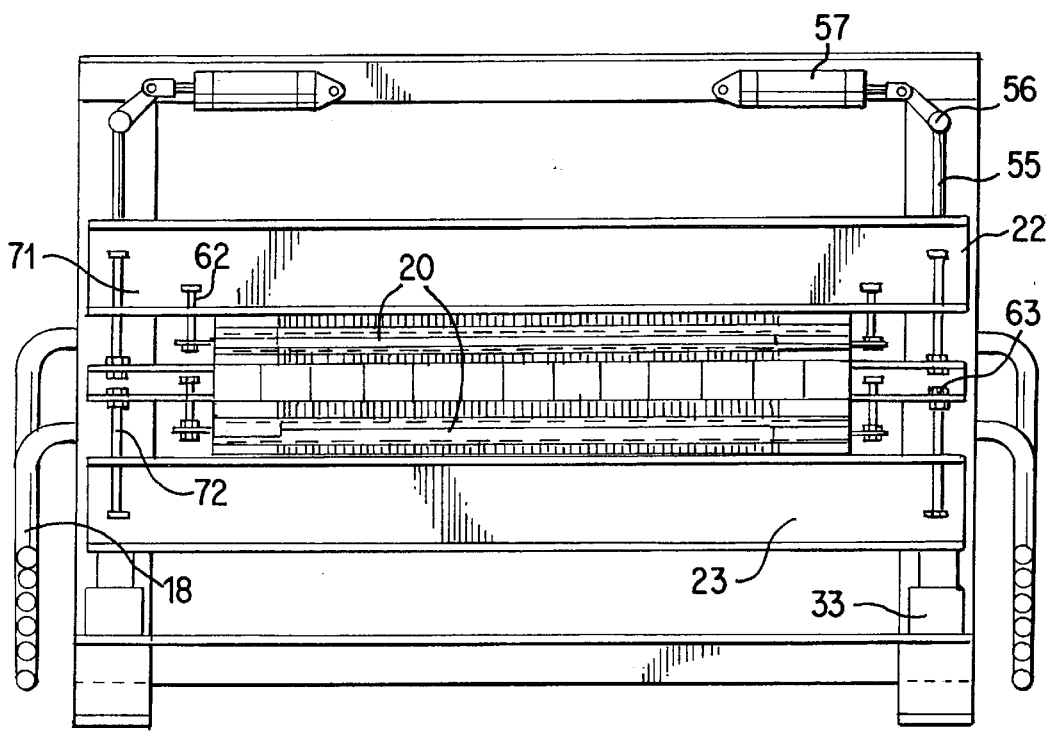
Figure 26:
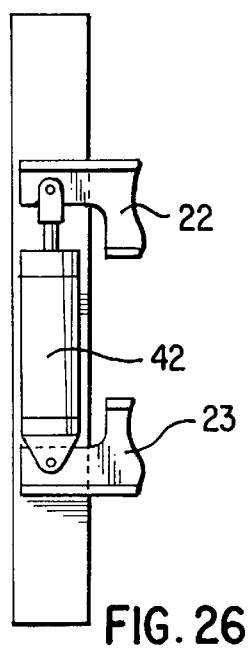
Figure 27:
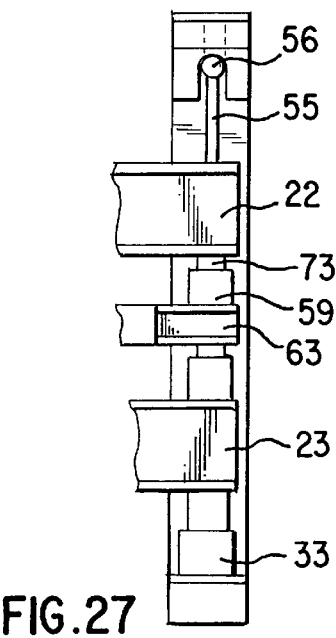

The high pressure-producing devices 33 are then actuated in order by mechanical means to reduce the volume of the sludge chambers 20 in a vertical direction and thus to produce an additional mechanical water-removal pressure which is possibly considerably above the hydrostatic pressure. That procedure is shown in FIGS. 25 through 27, illustrating the high pressure-producing devices 33 in their fully extended position in which the highest water-removal pressure has been reached. The locking latches 55 are furthermore closed in that condition and the lower pressure plate 23 has been moved upwardly towards the upper pressure plate 22 by the high pressure-producing devices 33. As illustrated, in this operation the upper parts 73 of the abutments 59 have been urged into the body parts thereof in order to permit a reduction in the spacing between the lower pressure plate 23 and the intermediate plate 63 and the intermediate plate 63 and the upper pressure plate 22. FIG. 25 shows in that respect how the entrainment members 62 and 71, 72 respectively permit those relative movements.

Figure 18:
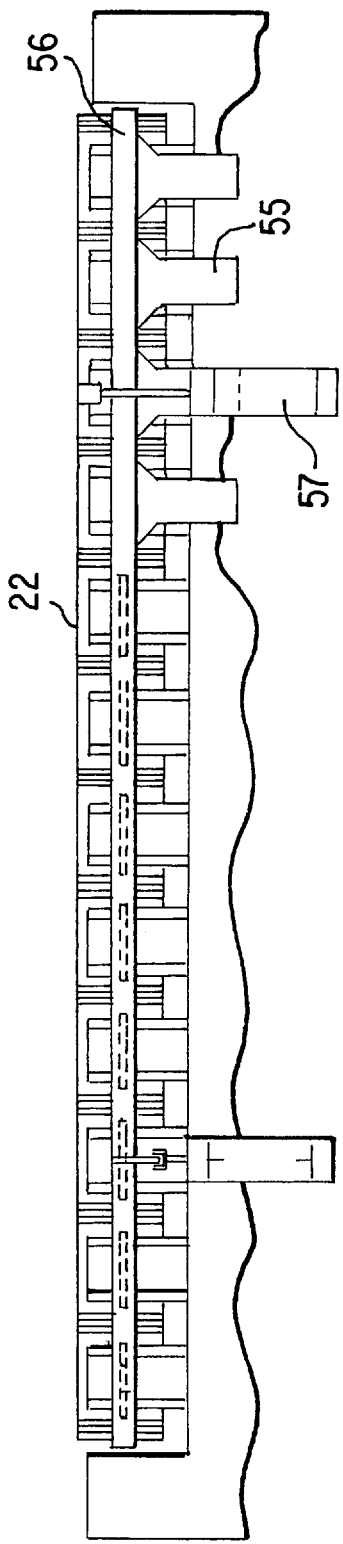
Figure 18A:
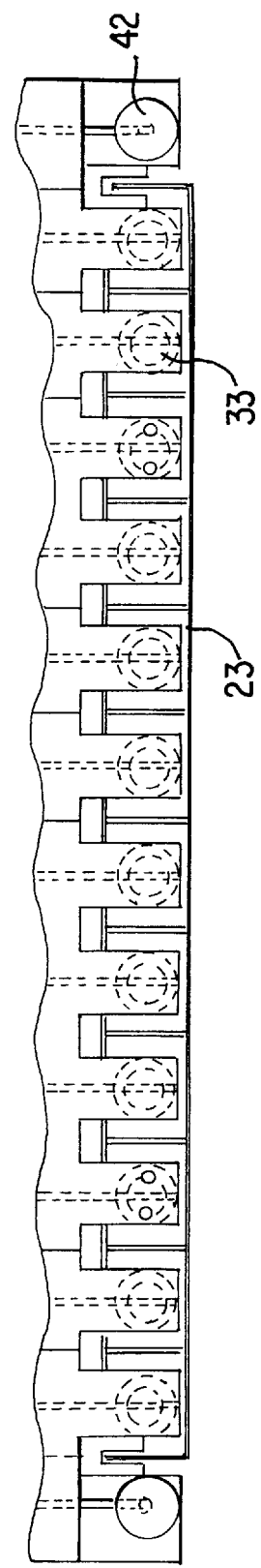

After the desired removal of water from the sludge in the sludge chambers 20 has been effected the high pressure-producing devices 33 are relieved of load, the locking latches 55 are opened and the cylinders 42 are actuated, whereupon the condition shown in FIGS. 17 through 19 has then been reached. The filter press 4 is thus ready for the further commencement of a cycle which, as described above, begins with the resulting filter cakes 74 being moved out of the filter press and ejected.

Figure 28:
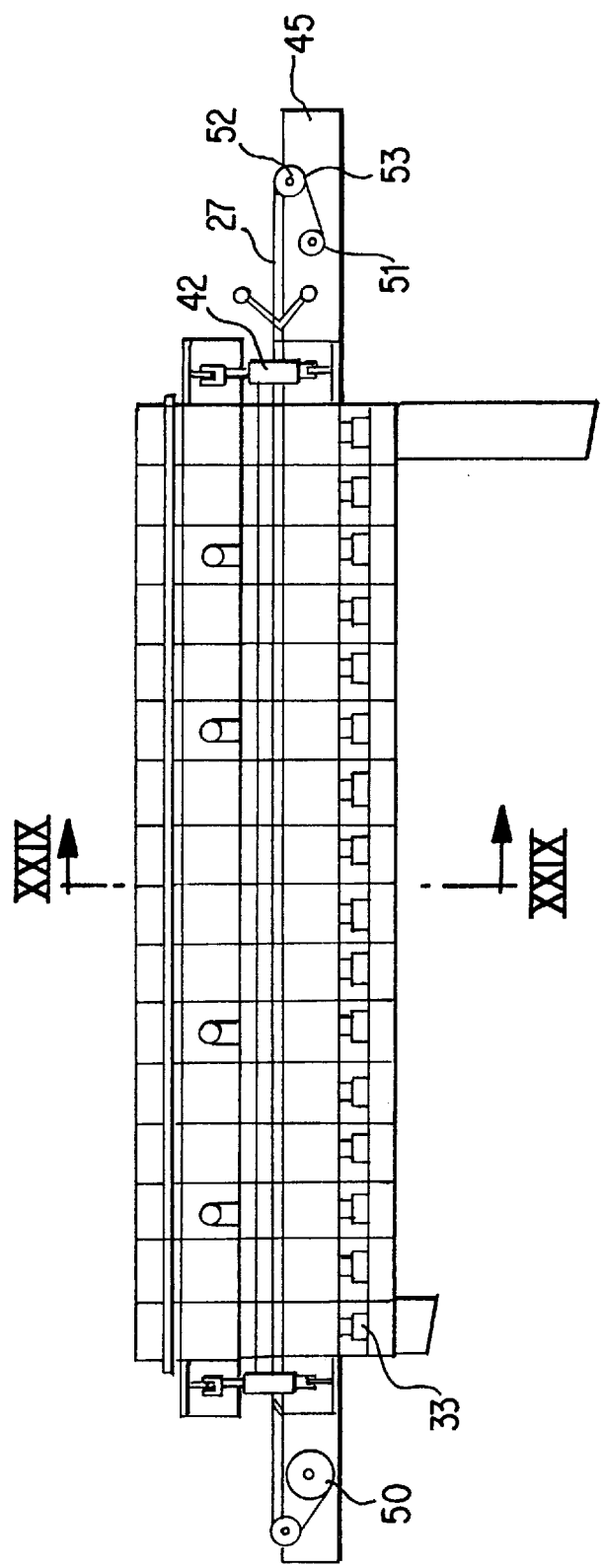
Figure 29:
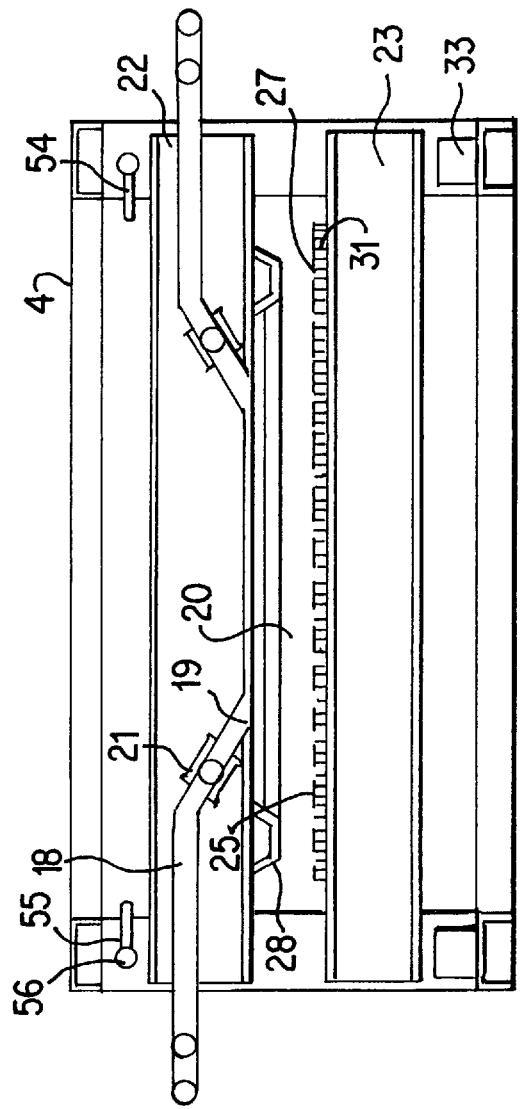

Reference is now made to FIGS. 28 and 29 showing a further embodiment of the filter press 4 in a diagrammatic side view and a view in section taken along line XXIX—XXIX in FIG. 28 respectively, as has already been shown in principle in FIGS. 5 through 7. The embodiment illustrated in FIGS. 28 and 29 involves an embodiment of a particularly simple structure, with only one sludge chamber 20.

In this embodiment, components which are the same or which have the same action are denoted by the same references as in the case of the above-described embodiments so that, in regard to technical features which are not described in detail once again at this point, attention can be directed to the foregoing description of the first two embodiments of the apparatus according to the invention.

In this embodiment the sludge chamber 20 only has one filter surface 25 which is formed by the lower filter belt 27 on the mounting or support plate 31. The sludge chamber 20 is enclosed on the top side by the seal 28 on the upper pressure plate 22 and the pressure plate 22 itself. In regard to the locking effects and movements required for carrying out the method as well as the movement of the filter belt 27 and production of the mechanical water-removal pressure, the assembly has the same structural features as the above-described embodiments.

As however the sludge chamber 20 is directly defined on the top side by the pressure plate 22, the sludge inlets 19 are provided directly in the upper pressure plate 22. The control valves 21 are also arranged in the upper pressure plate 22 in the lines 18 so that as a result the volume of sludge in the lines 18, which is acted upon by the mechanical water-removal pressure, is reduced. In regard to further details reference may be made to the foregoing description.

FIGS. 30 and 31 are sectional views of further particularly preferred embodiments of the seal 28 which in general terms are suitable for affording a lateral sealing effect in respect of pressure chambers which can be reduced in volume in a vertical direction.

The embodiment of the seal 28 shown in FIG. 30 is an embodiment as is particularly appropriate for use in the filter press shown in FIGS. 28 and 29. FIG. 30 shows the various operating conditions of the seal as indicated by a) through d). Part a) of FIG. 30 shows the position in which the sludge chamber 20 is closed and the hydrostatic pressure is built up by means of the intermediate containers 3. FIGS. 30b) through 30d) show progressive deformation of the seal 28 during production of the mechanical water-removal pressure in the filter press 4.

As illustrated the seal 28 comprises an integral elastic body of rubber or another suitable material which surrounds the periphery of the pressure chamber, that is to say in the illustrated embodiments of the apparatus in accordance with the invention, a sludge chamber 20.

Figure 30A:
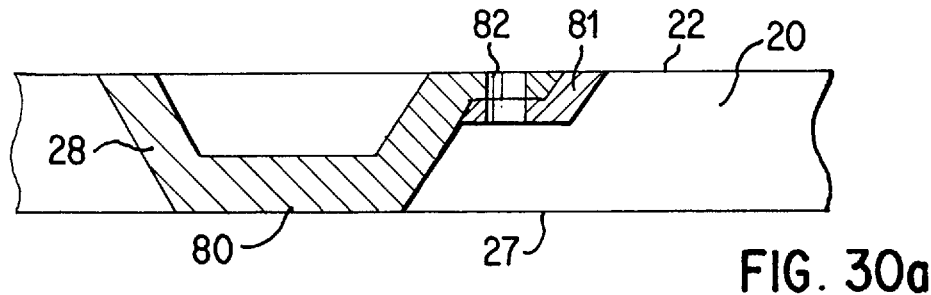
Figure 30B:
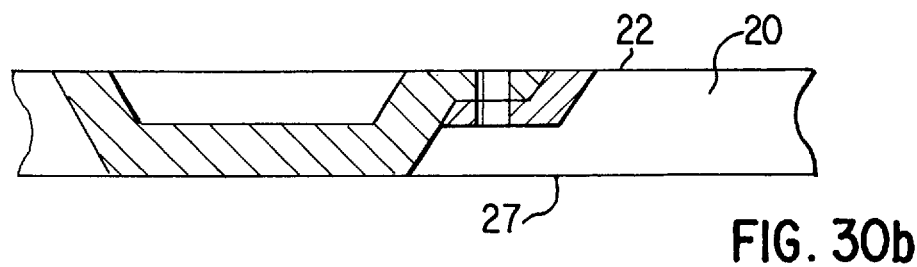
Figure 30C:
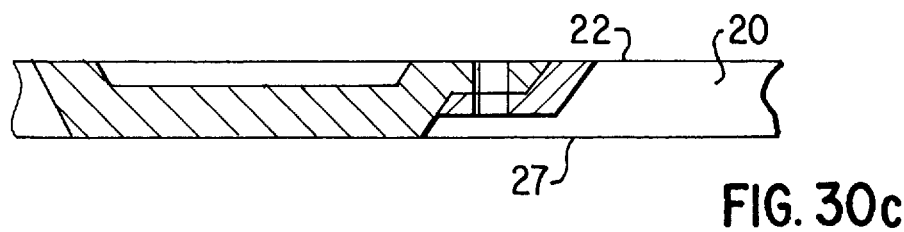
Figure 30D:
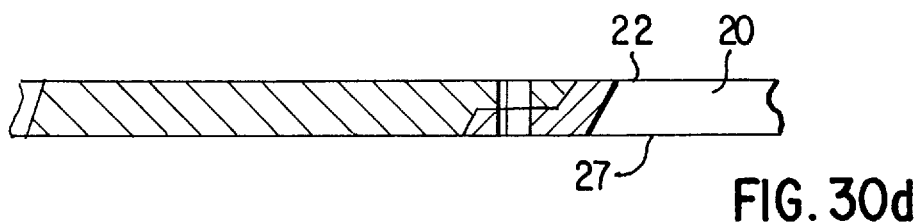

The body 80 of the seal, in the condition shown in FIG. 30a in which it is virtually still relieved of stress, is of an approximately dish-shaped configuration in cross-section. That configuration can be converted into a practically flat configuration, between the conditions illustrated at a) through d) in FIG. 30. The seal 28 is fixed to the upper pressure plate 22 in the illustrated embodiments of the apparatus according to the invention by a frame 81 by means of pins or bolts 82, the frame 81 at the same time representing an abutment for limiting the maximum closing movement of the pressure chamber 20.

As illustrated, the bevelling of the profile of both the seal 28 and also the frame 81 ensures that, upon a reduction in the volume of the pressure chamber 20, the sludge which is near the seal 28 and thus to the right thereof in FIG. 30 is displaced towards the right in FIG. 30 and is thus moved in the direction of the interior of the pressure chamber as indicated at 20.

FIG. 31 shows an embodiment of the seal 28 as is appropriate for use in connection with pressure chambers with filter surfaces which are disposed in mutually opposite relationship. In this respect FIG. 31 shows three different operating conditions of the seal 28. The middle operating condition as indicated at b) in FIG. 31 also shows at the same time the sludge inlet 19 which passes through the seal 28, into the sludge chamber 20.

In this embodiment also the seal 28 comprises an integral elastic body 80 of rubber or another suitable material, which extends around the periphery of the pressure chamber, being therefore in the illustrated embodiment of the apparatus according to the invention the sludge chamber 20.

Figure 31A:
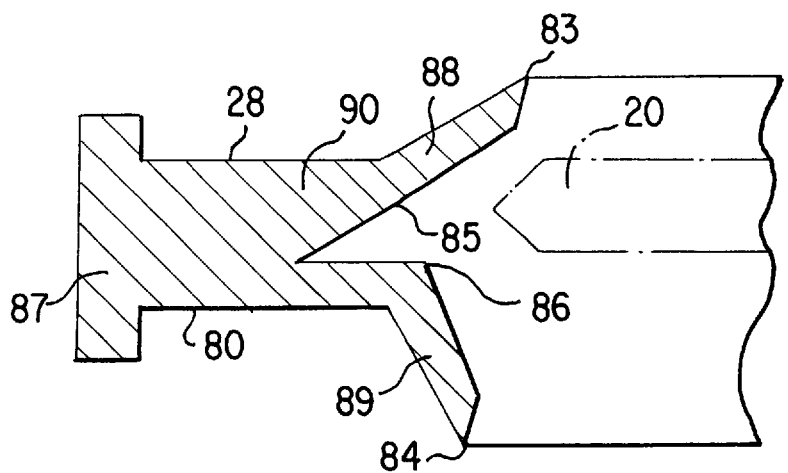
Figure 31B:
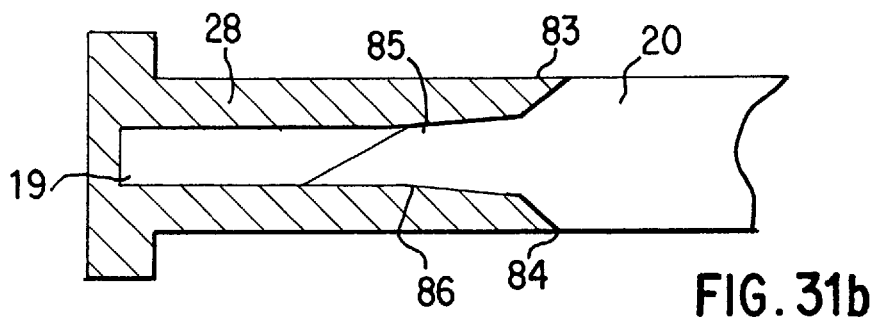

In the practically unstressed condition shown in FIG. 31a), the body 30 is in cross-section in the shape of a recumbent V, the tip of which is directed outwardly away from the sludge chamber 20, that is to say towards the left in FIG. 31. The free ends 88 and 89 of the V-shape each form a respective sealing lip 83 and 84 respectively, for bearing against the associated filter surface.

In the practically unstressed condition of the seal 28 as shown in FIG. 31a), as occurs in practice when the hydrostatic pressure is built up in the sludge chamber 20, a bend location 85 and 86 respectively is provided at horizontal and vertical spacings relative to the sealing lips 83 and 84 respectively on the inside of the V-shape at each of the ends 88 and 89. The angle which is included between the limbs of the V-shape increases at the bend locations 85 and 86. In that respect the increase in angle at the bend location 86 is a multiple of that at the bend location 85 as, when the mechanical water-removal pressure builds up in the sludge chamber 20, the lower filter surface is moved towards the upper filter surface. The symmetrical part of the V-shape is in a portion 90 of the cross-section of the seal 28, which is practically rectangular, and it forms in that portion 90 a notch or incision, with the lower limb of the symmetrical part of the V-shape extending parallel to the side edge of the rectangle.

Figure 31C:
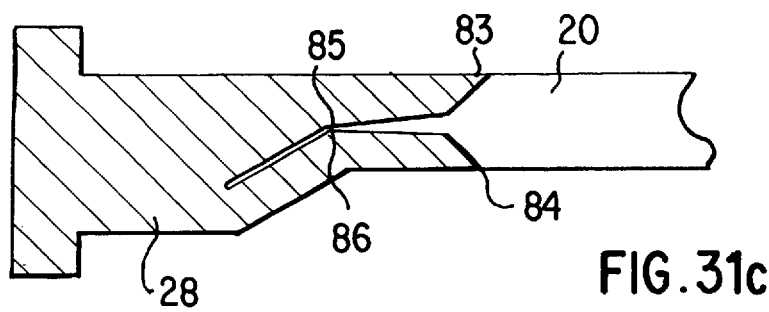

For the purposes of mounting and holding the seal 28, the rectangular portion 90 is provided with a clamping or fixing projection 87 which extends therearound and which, in the illustrated embodiments of the apparatus in accordance with the present invention, is clamped in the auxiliary frame 60. As it is used in accordance with the present invention, the vertical spacing between the sealing lips 83 and 84 in the unstressed condition of the seal is about 80 mm. When the sludge chamber 20 has been closed in order then to build up the hydrostatic pressure, the spacing between the sealing lips 83 and 84 is then about 60 mm. When, after the hydrostatic water-removal pressure of the required level has been reached, the apparatus then switches over to production of the additional mechanical water-removal pressure, the seal 28 can be compressed in this phase of operation to such a degree that the spacing between the sealing lips 83 and 84 is only then about 30 through 35 mm, as is shown in FIG. 31c). As can be seen from a comparison of FIG. 31a) with FIGS. 31b) and c), in that operation the two free limbs 88 and 89 move towards each other, in front of the bend locations 85 and 86, until they reach the condition shown in FIG. 31b), in which case the lower limb of the V-shape extends practically parallel to the filter surfaces while the upper limb of the V-shape extends parallel thereto only in front of the bend location 85. In the course of the last closing stroke movement of the two filter surfaces towards each other, the symmetrical part of the V-shape outside the bend locations 85 and 86 is then closed, in which case that whole series of movements simultaneously causes the filter cake to be urged out of the space between the two free limbs 81 and 82. When the sludge chamber 20 is opened the filter cake can then be easily released from the region in front of the bend locations 85 and 86 by virtue of the particular configuration of the cross-section of the seal 28.

It will be appreciated that the foregoing embodiments of the method and apparatus in accordance with the principles of the present invention have been set forth solely by way of example and illustration of the invention and that various modifications and alterations may be made therein without thereby departing from the spirit and scope of the invention.

What is claimed is:

1. Apparatus for removing water from sludge comprising:
   at least one sludge chamber which is closed on all sides and which includes a sludge inlet for introduction of the sludge,
   at least one filter surface for removal of water from the sludge introduced into the sludge chamber, said filter surface having respective sides,
   pressure plates on the respective sides of the filter surface and subjected to opening movement and closing movement with respect to said sludge chamber,
   means for producing relative movement of the pressure plates with respect to each other,
   means for displacing the filter surface for discharge of filter cake on the filter surface after the opening movement of the pressure plates with respect to the sludge chamber, and
   means for producing a hydrostatic filtration pressure in the sludge chamber and filling the sludge chamber, in the form of at least one intermediate container in fluid communication with said sludge inlet of said sludge chamber, the intermediate container comprising a piston-cylinder means including a cylinder housing and a piston displaceable therein and a drive means for displacement of said piston, the piston-cylinder means having a sludge inlet for a feed of sludge into said cylinder housing and a sludge outlet in fluid communication with the sludge inlet of said sludge chamber, alternately actuable valve means at the sludge inlet and the sludge outlet of the piston-cylinder means, and means for alternately actuating said valve means,
   wherein the sludge chamber is defined by an upper filter surface and a lower filter surface, and further including a flexible seal arranged between the upper and lower filter surfaces surrounding the sludge chamber, and
   wherein said flexible seal comprises a one-piece elastic body extending around a periphery of said sludge chamber, said body having a cross-sectional shape defining a recumbent V having a tip directed outwardly away from said sludge chamber, free ends of the recumbent V forming a respective sealing lip, and, provided at horizontal and vertical spacings from said sealing lip inside of the recumbent V, first and second mutually oppositely disposed bend locations at which an angle included between limbs of the recumbent V is adapted to increase.

2. Apparatus as set forth in claim 1 wherein said body comprises rubber.

3. Apparatus as set forth in claim 1 wherein a lower limb of the recumbent V extends at least substantially parallel to a bottom of the sludge chamber and said bend locations are of an asymmetrical configuration in that an increase in angle at a lower bend location is a multiple of an increase in angle at an upper bend location.

4. Apparatus as set forth in claim 1 wherein a symmetrical part of the recumbent V in front of said bend locations is a notch in a region of the seal which is of rectangular cross section.

5. Apparatus as set forth in claim 1 wherein said tip of the recumbent V is connected outside to a peripherally extending mounting projection portion.

6. Apparatus for removing water from sludge comprising:
   at least one sludge chamber which is defined by at least one filter surface for removal of water from sludge introduced into the sludge chamber,
   upper and lower pressure plates between which said filter surface is enclosed and forming top and bottom walls, a flexible seal surrounding the sludge chamber and forming side walls thereof, said sludge chamber having at least one sludge inlet for introduction of the sludge,
   means for producing a closing and opening relative movement of the pressure plates with respect to each other to create an opened position and a closed position of the sludge chamber,
   means for displacing the filter surface with respect to the sludge chamber for discharge of filter cake on the filter surface when the sludge chamber is in the opened position,
   means for producing a hydrostatic filtration pressure in the sludge chamber including at least one intermediate container in fluid communication with said sludge inlet of said sludge chamber, the intermediate container comprising a piston-cylinder arrangement including a cylinder housing, a piston displacement therein, and a drive means for displacement of said piston, the piston-cylinder arrangement having a sludge inlet for feeding sludge into said cylinder housing and a sludge outlet in fluid communication with the sludge inlet of said sludge chamber,
   alternately actuable valves at the sludge inlet and the sludge outlet of the piston-cylinder arrangement,
   means for alternately actuating said valves, and
   further pressure-producing means, on which the lower pressure plate is supported, for displacing said lower pressure plate to reduce a volume of the sludge chamber by reducing a distance between said upper pressure plate and said lower pressure plate after the hydrostatic filtration pressure is reached and the valve at the sludge outlet of the piston-cylinder arrangement is closed so as to generate an additional mechanical pressure for removing water from the sludge in the sludge chamber.

7. Apparatus as set forth in claim 6 wherein the sludge chamber has a plurality of sludge inlets and wherein said at least one intermediate container is one of a plurality of intermediate containers corresponding to said sludge inlets and further comprising a respective connecting line connecting a sludge outlet of each intermediate container to a respective one of the sludge inlets of the sludge chamber.

8. Apparatus as set forth in claim 6 wherein said valves comprise globe valves.

9. Apparatus as set forth in claim 6 wherein said filter surface comprises at least one filter belt and further including means for producing rectilinear reciprocating movement of said filter belt.

10. Apparatus as set forth in claim 6 wherein the sludge chamber is defined by an upper filter surface and a lower filter surface, and further including a flexible seal arranged between the upper and lower filter surfaces surrounding the sludge chamber.

11. Apparatus as set forth in claim 10 and further including an auxiliary frame to which the seal is fixed.

12. Apparatus as set forth in claim 11 including entrainment means for movably suspending the auxiliary frame on the upper pressure plate.

13. Apparatus as set forth in claim 6 wherein said sludge chamber has an oval contour.

14. Apparatus as set forth in claim 6 and further comprising a mounting plate for supporting said filter surface outside of said sludge chamber, the mounting plate having a duct opening to the filter surface.

15. Apparatus as set forth in claim 14 wherein said duct is of a rectilinear configuration in a longitudinal direction and is in parallel relationship with a main axis of the sludge chamber.

16. Apparatus as set forth in claim 6 wherein said sludge chamber with said at least one filter surface is inclined in a longitudinal direction thereof.

17. Apparatus as set forth in claim 16 wherein an inclination of the sludge chamber corresponds to a fall of the filter surface of about 10°.

18. Apparatus as set forth in claim 6 wherein said lower pressure plate comprises a hydraulic bed formed by a plurality of said pressure-producing means arranged so as to be distributed in a side-by-side relationship over at least one of a length and a width of said lower pressure plate.

19. Apparatus as set forth in claim 18 wherein said pressure-producing means are arranged in a plurality of rows within an oval contour of said sludge chamber, adjacent rows of the pressure-producing means being displaced relative to each other.

20. Apparatus as set forth in claim 6 wherein said pressure-producing means are arranged laterally outside an area covered by the sludge chamber.

21. Apparatus as set forth in claim 6 wherein the pressure-producing means comprise hydraulic single-acting cylinders.

22. Apparatus as set forth in claim 6 and further comprising locking means for mechanically locking the sludge chamber in the closed position.

23. Apparatus as set forth in claim 22 wherein said locking means include a locking latching device acting on the upper pressure plate.

24. Apparatus as set forth in claim 6 wherein said at least one sludge chamber is one of a plurality of sludge chambers arranged in a superposed stack.

25. Apparatus as set forth in claim 24 and further comprising a respective intermediate plate disposed between the upper and lower pressure plates to provide a respective sludge chamber between said lower pressure plate and said intermediate plate and between said intermediate plate and said upper pressure plate, said intermediate plate having, on its top and bottom, a support plate and a respective filter belt, and further including an auxiliary frame with a seal which is also suspended at the underside of a support plate and a respective filter belt, and further including an auxiliary frame with seal which is also suspended at the underside of the intermediate plate.

26. Apparatus as set forth in claim 25 and further comprising abutment means disposed between said pressure plates and said intermediate plate for fixing a height of the sludge chamber.

27. Apparatus as set forth in claim 26 wherein said abutment means are compressible according to a reduction in volume of the sludge chamber.

28. Apparatus as set forth in claim 6 and further comprising a predewatering means for preliminary removal of water from the sludge, said predewatering means being disposed upstream of said intermediate container and having a sludge outlet connected to the sludge inlet of the piston-cylinder arrangement.

29. Apparatus as set forth in claim 28 wherein said predewatering means comprises a compensating chamber having an inlet for receiving a continuous sludge feed.

30. Apparatus as set forth in claim 28 wherein said predewatering means has at least one filter basket provided with a filtrate outlet and adapted to be immersed in the sludge, said filter basket having a sludge-side and a filtrate side.

31. Apparatus as set forth in claim 30 wherein said filter basket is stationary and further including at least one brush extending over a height of the filter basket and adapted to rotate at a filtrate side thereof.

32. Apparatus as set forth in claim 6 and further comprising abutment means disposed between said pressure plates for limiting a distance between said pressure plates.

33. Apparatus as set forth in claim 32 wherein said abutment means are compressible according to a reduction in volume of the sludge chamber.

34. Apparatus as set forth in claim 32 wherein said abutment means are resilient according to a reduction in volume of the sludge chamber.

* * * * *